(12) United States Patent
Annem et al.

(10) Patent No.: US 7,877,524 B1
(45) Date of Patent: Jan. 25, 2011

(54) LOGICAL ADDRESS DIRECT MEMORY ACCESS WITH MULTIPLE CONCURRENT PHYSICAL PORTS AND INTERNAL SWITCHING

(75) Inventors: Babysaroja Annem, Allentown, PA (US); Heng Liao, Belcarra (CA); Zhongzhi Liu, Chengdu (CN); Praveen Alexander, Royersford, PA (US)

(73) Assignee: PMC-Sierra US, Inc., Santa Clara, CA (US)

( * ) Notice: Subject to any disclaimer, the term of this patent is extended or adjusted under 35 U.S.C. 154(b) by 239 days.

(21) Appl. No.: 12/277,194

(22) Filed: Nov. 24, 2008

Related U.S. Application Data

(60) Provisional application No. 60/989,847, filed on Nov. 23, 2007.

(51) Int. Cl.
*G06F 13/28* (2006.01)
(52) U.S. Cl. .......................................... 710/26; 710/22
(58) Field of Classification Search .................. 710/26, 710/22
See application file for complete search history.

(56) References Cited

U.S. PATENT DOCUMENTS

| 6,732,198 B1 * | 5/2004 | Johnson et al. ................ 710/22 |
| 7,716,389 B1 * | 5/2010 | Bruce et al. .................... 710/22 |
| 2005/0149632 A1 * | 7/2005 | Minami et al. ............... 709/237 |
| 2006/0190689 A1 * | 8/2006 | Van Niekerk ................ 711/147 |

\* cited by examiner

*Primary Examiner*—Alford W Kindred
*Assistant Examiner*—David E Martinez
(74) *Attorney, Agent, or Firm*—Dennis R. Haszko

(57) ABSTRACT

A DMA engine is provided that is suitable for higher performance System On a Chip (SOC) devices that have multiple concurrent on-chip/off-chip memory spaces. The DMA engine operates either on logical addressing method or physical addressing method and provides random and sequential mapping function from logical address to physical address while supporting frequent context switching among a large number of logical address spaces. Embodiments of the present invention utilize per direction (source-destination) queuing and an internal switch to support non-blocking concurrent transfer of data on multiple directions. A caching technique can be incorporated to reduce the overhead of address translation.

22 Claims, 21 Drawing Sheets

LOGICAL ADDRESS DIRECT MEMORY ACCESS WITH MULTIPLE CONCURRENT PHYSICAL PORTS AND INTERNAL SWITCHING

CROSS-REFERENCE TO RELATED APPLICATIONS

This application claims the benefit of U.S. Provisional Patent Application No. 60/989,847 filed on Nov. 23, 2007, which is incorporated herein by reference in its entirety.

FIELD OF THE INVENTION

The present invention relates generally to memory communication in computers. More particularly, the present invention relates to direct memory access (DMA) address translation.

BACKGROUND OF THE INVENTION

Direct memory access (DMA) is a feature of modern computers that allows certain hardware subsystems within the computer to access system memory for reading and/or writing independently of the central processing unit. Many hardware systems use DMA including disk drive controllers, graphics cards, network cards, and sound cards. Computers that have DMA channels can transfer data to and from devices with much less Central Processing Unit (CPU) overhead than computers without a DMA channel.

Without DMA, using programmed input/output (PIO) mode, the CPU typically has to be occupied for the entire time it is performing a transfer. With DMA, the CPU can initiate the transfer, do other operations while the transfer is in progress, and receive an interrupt from the DMA controller once the operation has been completed. This is especially useful in real-time computing applications where not stalling behind concurrent operations is critical.

A typical usage of DMA is copying a block of memory from system RAM to or from a buffer on the device. Such an operation does not stall the processor, which as a result can be scheduled to perform other tasks. DMA transfers are essential to high performance embedded systems. They are also essential in providing so-called zero-copy implementations of peripheral device drivers as well as functionalities such as network packet routing, audio playback and streaming video.

Scatter/gather is used to do DMA data transfers of data that is written to noncontiguous areas of memory. A scatter/gather list is a list of vectors, each of which gives the location and length of one segment in the overall read or write request.

There are many variants of Scatter-Gather List (SGL) format, one example of which is defined in IEEE 1212.1 Block Vector Structure Specification. The format of an SGL element with a chaining example is shown FIG. 1. Within each scatter/gather element is a 4-byte buffer length and an 8-byte buffer address. There is also a 4-byte reserved field, for alignment, with the most significant bit defined as the extension bit (ext). An extension bit set to logical '1' designates the descriptor as pointing to a chained buffer of scatter/gather descriptors. Only the last scatter/gather descriptor may chain, it does not have to chain. A chained scatter/gather list may chain to another scatter/gather list. The end of the scatter/gather list is realized by matching the scatter/gather count.

A buffer length of zero, as shown in the fourth entry 40, signifies that no data is transferred for that scatter/gather element. It does not signify end of list, nor does it have any other special meaning. In addition to the above IEEE defined fields, the bit immediately to the right of the extension bit in the SGL element (eob—byte 15, bit 6) is reserved for indicating whether the SGL element is the last element for that SGL list. This bit is called the end-of-buffer (eob) bit and when set to a logical '1' indicates that the particular SGL element is the last element for that particular SGL list. The DMA ideally will not request a data length that goes beyond the cumulative length indicated by this last element for a given SGL list. If the DMA requests data beyond the last SGL element's size, the Scatter-Gather Block will trigger an error interrupt, and will freeze all operations.

A DMA structure supporting SGL is a common feature of storage controller and high performance network interface cards. High-end storage controllers for Small Computer System Interface (SCSI), Serial Attached SCSI (SAS), or Fiber Channel controllers typically support a large number of directly or indirectly attached target devices, and support a number of concurrent input/output (I/O) commands per target device. Each of the outstanding commands (e.g. SCSI I/O Read or Write) is associated with at least one pre-allocated data buffer that either holds the data to be transmitted for a Write command, or provides the space to receive the data from the execution of a Read command from SCSI protocol perspective, each of the data buffers is addressed linearly as data is transferred, while physically the data buffer can be fragmented in non-contiguous regions.

The SGL is typically used to represent a user data buffer that is pre-allocated for each outstanding I/O. Typically, the storage interface bus, such as SAS links, are shared by multiple target devices when these devices are indirectly attached through expanders. As a result, the data frames from the concurrent I/O are time interleaved over a physical bus interface, each frame representing a portion of data belonging to a larger I/O. To deliver the data into the appropriate buffer associated with the I/O, the DMA engine needs to switch context from one SGL to another at the boundary of frame sequences representing different I/Os. This requirement of context switching between partial transfers among different SGLs imposes significant challenges on the DMA design as the DMA needs to track the current position of transfer at each SGL.

As noted before, physically, a data buffer is organized as a sequence of buffer fragments, as denoted by SGL. There are several reasons why the data buffers need to be fragmented.

Page fragments: The first reason is virtual memory management in the host CPU and operating system. Modern CPUs support virtual memory via the intelligent Memory Management Unit (MMU), which utilizes a hierarchy of segment and or page tables to map a logically contiguous user memory space for each process into the physical memory hierarchy, for protection of one user space from another, and to provide a linear view of memory from each user process. This also allows the logical memory space to be much larger than the actual physical main memory space by swapping a certain region of logical memory that is currently not in use with much larger disk swap space. Before a data buffer can be used as a DMA data buffer, typically, the application layer allocates a data buffer in virtual address space, the kernel or device driver page locks the virtual address buffer to ensure the entire virtual address buffers are loaded and fixed in physical main memory space (no swapping to disk). Since the virtual to physical address translation is done based on MMU pages (e.g. 4K byte long physical memory that is perfectly aligned at 4K address boundaries), the virtual buffer is now mapped into a sequence of physical pages, each page being uniform in size and alignment that can be presented by a SGL. However, since the virtual address buffer can start at arbitrary byte address granularity, the first byte of the virtual address buffer can start from an arbitrary byte offset of a physical page. In other words, the SGL represents a sequence of uniform size pages that is page aligned, except for the first fragment that can start at arbitrary byte offset of a page, and the last fragment can end at arbitrary byte offset of another page.

Arbitrary fragments: The second form of buffer fragment can be much more constraint-free. This is often caused by an application directly using arbitrarily arranged fragments (with no size or alignment constraints) in the user space (either virtual memory of physical memory space) and using these as an I/O buffer. For example, a modern operating system (OS) supports the file system of an I/O subsystem Application Programming Interface (API) that accepts SGL as a buffer argument for disk I/Os. The purpose is to minimize unnecessary memory movement in software. For example, a user program wants to write some data fields from various data structures into a file. Instead of allocating a contiguous data buffer in the virtual address space as a temporary workspace to copy all the necessary fields before issuing the I/O from the workspace buffer, the user program chooses to create a SGL with each entry pointing to the direct location of the necessary data structure fields to be written, and then issues a write I/O operation to the file system using SGL as the argument representing the I/O buffer. This creates an I/O operation using an arbitrary SGL with the benefit of eliminating the extra step of managing the workspace buffer and the data movement between data structure and workspace.

There are a number of well-known DMA techniques that suffer from the following disadvantages.

DMA addressing: The majority of known DMA techniques operate in physical address space. This means the requestor of a DMA operation specifies a DMA request using physical addresses, or an SGL that contains physical address information for each DMA operation. This approach is quite intuitive and simple when handling data movement in contiguous data buffers. However, when the DMA operation needs to do context switching between partial transfers using different SGLs, the use of physical addressing places a significant burden on the DMA master (requestor). To enable the DMA to resume data transfer on a partial SGL buffer, the DMA needs to save much information in SGL partial transfer context, including: the current pointer in SGL, the head pointer to the SGL, the current fragment physical address, and the remaining byte count within the current fragment. Such context needs to be managed on per concurrent SGL basis. When the DMA resumes data transfer on an SGL buffer, the DMA needs to reload the partial context to allow proper physical address calculation. The SGL partial context not only adds significant complexity to both the DMA engine and the DMA master, but also adds cost for the context storage, and reduces the performance of the DMA engine because of the extra processing step involved in context management. This problem can be particularly severe in a storage controller application that needs to support a large number of concurrent I/Os (SGLs) that are time interleaved over the physical bus.

There are some DMA methods that support data transfer based on virtual addresses. This approach utilizes an address mapping structure analogous to CPU MMU. A Table Lookup Buffer (TLB) structure is used to implement a virtual address to physical address translation scheme. This approach is well suited for limited SGL buffers denoted as "page fragments" described above. However, because of the page index based lookup structure, this approach can only handle uniform size buffer fragments. Therefore, it cannot support "arbitrary fragments" that have no restrictions on the alignment and size of each buffer fragment.

Due to the complexity of SGLs involved, known DMA structures have various degrees of difficulty in supporting time interleaved partial sequential transfers with multiple SGLs, and/or random partial transfers using an SGL. It is worth noting that random partial transfers with SGL, although rare, are a necessary function to support modern storage protocols, such as SAS, that generate requests that can move the current position within a SGL buffer to a random offset (most likely backwards) while handling transport layer retry conditions.

Concurrent data transfers and request queue organization: Known DMA structures typically sit on an arbitrated system bus, which connects multiple bus masters to slaves such as the memory controller that provides access to main system memory. The DMA being a bus master can arbitrate for access of the slave (i.e. the main memory) and when the access request is granted, the DMA generates bus transactions to perform memory read or write operations. When there are multiple slave memory spaces, such as off-chip main memory space connected through a memory controller, Peripheral Component Interconnect (PCI) host memory space connected through a PCI controller, and on-chip memory space, these memory spaces are treated as independent system bus slave devices that the DMA can access through the system bus interface.

While the independent memory interfaces can operate in parallel, known DMA structures and system bus interconnects limit the concurrency of these memory spaces due to a number of common architectural characteristics causing lack of concurrent switching within the DMA datapath. For example, a shared system bus limits the transactions to one master-slave pair at anytime. As a result, when the DMA is accessing one memory interface, it cannot transfer data with a different memory transfer. In another example, of a non-blocking switch based system bus interconnect, the DMA only occupies one physical port of the system bus switch. In this state, even though the system bus allows multiple masters to access multiple slaves in a non-colliding traffic pattern, the DMA cannot transfer data with two independent slaves (memory spaces) simultaneously limited by the master port occupied by the DMA engine, because the DMA is connected to the system bus switch through one shared physical port for accessing all of the memory spaces.

Another common architectural characteristic is a Shared Request queue structure. Known DMA approaches tend to use common request First Come First Serve (FCFS) queues that are shared by data transfers in all directions, wherein the direction of a transfer is defined by the source memory space-destination memory space pair. Even though many DMA structures support multiple queue organizations based on priority or type of transfer, the lack of segregation of request queues based on direction of data movement fundamentally limits the parallelism of data transfer because of Head of Line (HOL) blocking issue. Consequently, such DMA engines cannot fully utilize the parallel bandwidth of the physical memory spaces. For example, if request A wants to move a piece of data from PCI to Double Data Rate (DDR) memory, while request B wants to move another piece of data from internal memory to PCI. Even though the physical memory spaces (PCI interface read, DDR write, internal Random Access Memory (RAM) read, PCI interface write) can support the parallel execution of transfers A and B, when A and B are posted into a common queue in sequence, such two transfers will take place sequentially, resulting in idle time of the memory bus interfaces at various time stages, which in turn means lower system throughput, longer processing time for a given task, more waste of bandwidth on the memory and external interfaces.

SGL caching: Known DMA engines that handle SGL require the DMA engine, or the DMA master/requestor to keep track of the SGL context for each list, including the pointer to the current SGL entry, the current offset within the SGL fragment, the pointer to the head of the SGL, etc. Or, alternatively, for prior art architectures that do not keep SGL context, the DMA engine is required to perform full SGL traversal for each DMA transfer using SGL. The first approach not only adds the cost of context storage on a per SGL list basis, but also adds significant complexity to the DMA master for the interpretation of SGL format, SGL traversal, context maintenance and manipulation.

Internal switch—Virtual Output Queuing (VOQ): Known DMA engines use a combination of a VOQ buffer and crossbar switch with VOQ arbiter for achieving non-blocking data transfer between input and output ports of the crossbar. The application of known crossbar arbitration techniques requires the data transfers to be divided into fixed time slots, corresponding to fixed data cell sizes, so that all ports can operate in lockstep based on a fixed time scale. Due to speed differences among the different memory spaces, applying fixed time slot techniques requires a certain amount of output buffer to be reserved for rate adaptation, and for adaptation between different native burst sizes.

Port trunking: Known DMA engine throughput is limited to the speed of the individual physical port of the memory interface. There is no known DMA method that can increase the data throughput via the use of striping data across multiple physical ports to the same memory space while preserving the ordering or DMA operations and indications.

Hole Insertion/Removal: Known DMA engines lack the capability to insert or remove holes within the data stream based on pre-defined fixed spacing between the adjacent holes and the pre-defined gap size of the hole. Such a feature can be useful for handling Data Protection Information (DPI) which requires the insertion of a checksum and tags on a per sector basis.

Endianess transformation: Known DMAs operate on consistent bus endianess format. Hence, they are incapable of transferring data between buses with different width and endianess definitions. A system where such a requirement exists would be, for example, a System On Chip (SOC) having a big-endian 32-bit CPU that needs to transfer a block of data to a PCI space that organizes data in 64-bit little-endian format.

Descriptor pipelining to accommodate very long bus latency: Known DMAs process one DMA descriptor at a time. Some designs pre-fetch the next DMA descriptor while the current DMA descriptor is in progress to overlap the time of descriptor fetching and the DMA transfer. Such designs with single or dual descriptors in the processing pipeline are sufficient to achieve high system throughput when the latency for a descriptor is low compared to the processing time for the actual DMA transfer. However, for systems where the DMA transfer is dominated by small transfers (transfer a small number of bytes) and the bus latency for descriptor fetching is low, the throughput declines because the DMA incurs idle time waiting for DMA fetching due to the long latency. To achieve high throughput in high latency systems for small DMA transfers, novel architecture enhancements are necessary.

DMA Bypass Mode: Known DMA controllers do not support DMA transfer where the descriptor is fetched and written back immediately without transferring data from source node to sink node. This feature could be useful in system level performance analysis.

It is, therefore, desirable to provide an improved DMA approach that overcomes one or more of the disadvantages of current DMA approaches.

SUMMARY OF THE INVENTION

Due to the shortcomings of both physical address DMA and virtual address DMA, there exists a pressing need to solve the DMA address translation by treating each logical data buffer as one independent linear logical space, while the underlying physical memory is defined by an SGL with arbitrary fragments. This approach is an element of embodiments of the present invention that are called logical addressing and address translation based on SGL.

Embodiments of the present invention adopt a switch fabric design technique and apply it in combination with a read port arbiter, read port logic and the write port logic to achieve non-block concurrent operation of DMA channels. Embodiments of the present invention further utilize an arbitration scheme that is not based on fixed time slots for data transfer.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 18 illustrates 10-byte data in little-endian on a 64-bit data bus (Starting Address=3) according to an embodiment of the present invention;

FIG. 19 illustrates 10-byte data in little-endian on a 128-bit data bus (Starting Address=3) according to an embodiment of the present invention;

FIG. 20 illustrates 10-byte data in 32-bit big-endian on a 64-bit data bus (Starting Address=3) according to an embodiment of the present invention;

FIG. 21 illustrates 10-byte data in 32-bit big-endian on a 128-bit data bus (Starting Address=3) according to an embodiment of the present invention;

FIG. 22 illustrates 10-byte data in 64-bit big-endian on a 64-bit data bus (Starting Address=3) according to an embodiment of the present invention;

FIG. 23 illustrates 10-byte data in 64-bit big-endian on a 128-bit data bus (Starting Address=3);

DETAILED DESCRIPTION

Figure 1:
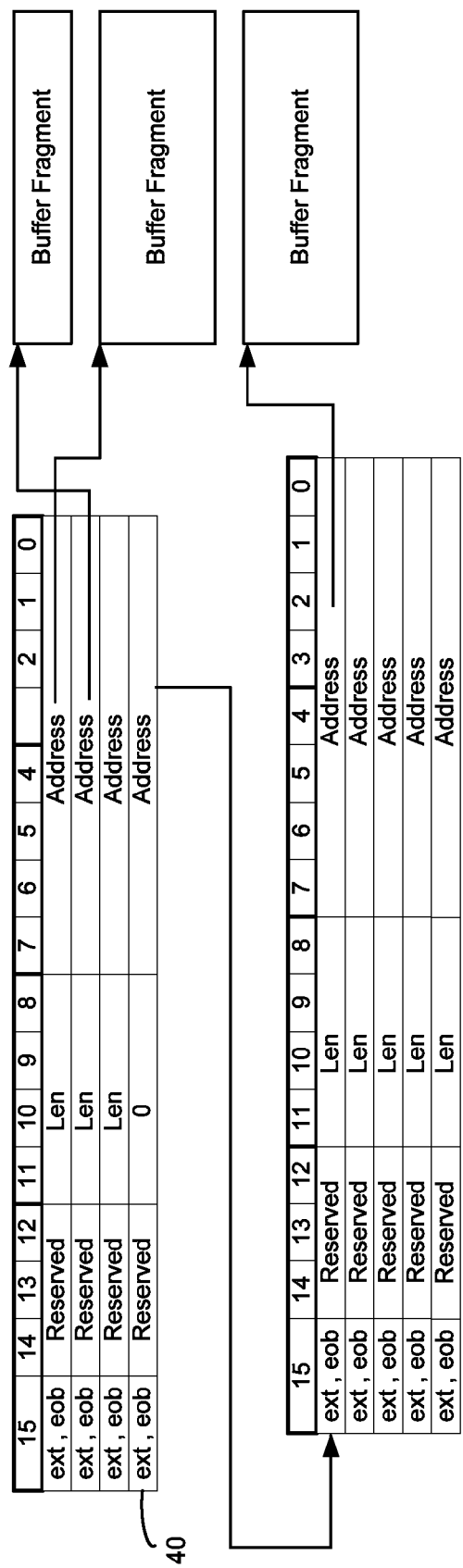
FIG. 1 illustrates a scatter gather element in IEEE 1212.1 format.

Generally, the present invention provides a DMA engine that is suitable for higher performance SOC devices that have multiple concurrent on-chip/off-chip memory spaces. The DMA engine operates either on a logical addressing method or physical addressing method and provides random and sequential mapping functionality from logical addresses to physical addresses, while supporting frequent context switching among a large number of logical address spaces. Embodiments of the present invention utilize per direction (source-destination) queuing and an internal switch to support non-blocking concurrent transfer of data in multiple directions. A caching technique can be incorporated to reduce the overhead of address translation. Embodiments of the present DMA architecture utilize a number of techniques to address the problems that exist in known DMA structures. The described system and methods are particularly useful in high performance applications, such as RAID On a Chip SOC applications (ROC SOC).

The architecture discussed in relation to embodiments of the present invention is not restricted to storage systems. This can be implemented in any network system that requires transferring data between multiple memory resources, and is particularly applicable to RAID controllers.

In the following description, for purposes of explanation, numerous details are set forth in order to provide a thorough understanding of the embodiments of the invention. However, it will be apparent to one skilled in the art that these specific details are not required in order to practice the invention. In other instances, well-known electrical structures and circuits are shown in block diagram form in order not to obscure the invention. For example, specific details are not provided as to whether the embodiments of the invention described herein are implemented as a software routine, hardware circuit, firmware, or a combination thereof. Embodiments of the invention can be represented as a software product stored in a machine-readable medium (also referred to as a computer-readable medium, a processor-readable medium, or a computer usable medium having a computer-readable program code embodied therein). The machine-readable medium can be any suitable tangible medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention can also be stored on the machine-readable medium. Software running from the machine-readable medium can interface with circuitry to perform the described tasks.

Addressing and Address Translation Method

Figure 2:
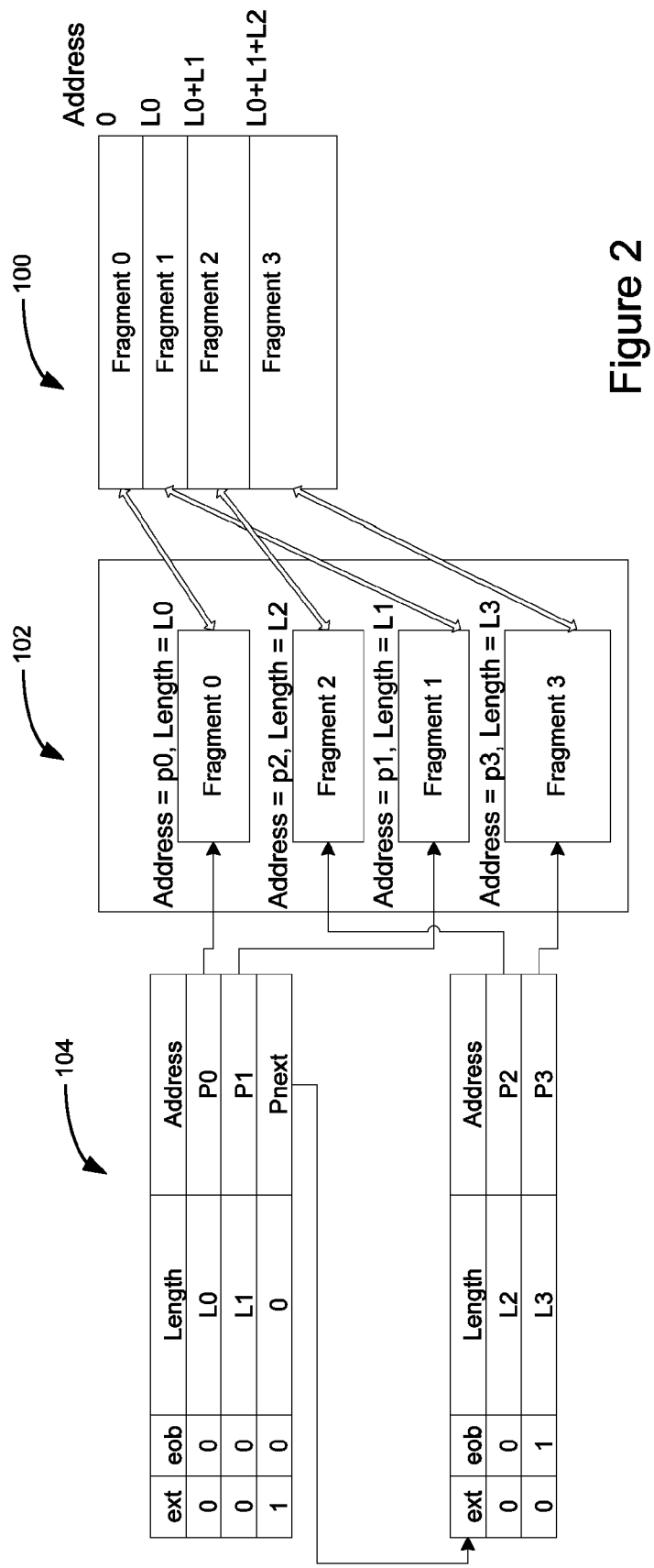
FIG. 2 illustrates a logical offset to physical address translation within one SGL according to an embodiment of the present invention.

Embodiments of the present invention utilize a logical buffer address to physical address translation scheme to simplify the processing of partial buffer transfer using a large number of concurrent SGLs. FIG. 2 illustrates the mapping of a contiguous logical offset address, as denoted by the contiguous logical offset address space 100, to a physical SGL buffer consisting of four physical buffer fragments, as shown in the fragmented physical memory address space 102, with arbitrary address alignment and arbitrary fragment length, as denoted by the chained SGL 104. This address translation scheme allows a DMA master/requestor to view the fragmented SGL buffer 102 as the single contiguous logical address space 100 that can be accessed in a random fashion.

Since the SGL 104 involved defines the SGL buffer as a sequence of four buffer fragments, denoted as Fragment0 through Fragment3, the SGL defines the logical address space as an independent contiguous address space starting at logical offset 0, and ending at logical offset (L0+L1+L2+L3−1) equal to the total length of all buffer fragments. Logical offset 0 through L0−1 is mapped to the physical address of Fragment0, i.e. P0, P0+1, . . . (P0+L0−1). Similarly the logical offset addresses starting from L0, L0+1, through L0+L1−1 are mapped to the physical address range occupied by Fragment1, as represented by physical address range P1, P1+1, . . . P1+L1−1. This process mapping is defined by the following process:

X: the logical offset address

N: the total number of SGL fragments

P[I] (I=0 . . . N−1): the physical start address of Fragment1

L[I] (I=0 . . . N−1): the length of physical Fragment1

Y: the physical address corresponding to logical offset address X.

$$\left[0, \sum_{i=0}^{N-1} L[i] - 1\right],$$

For X within the range of $$Y = \text{mapping}(X) = P[j] + X - \sum_{i=0}^{j-1} L[i]; \text{ where } X \in \left[\sum_{i=0}^{j-1} L[i], \sum_{i=0}^{j} L[i]\right];$$

The formula above defines the mapping of logical offset addresses using a single, or chained, SGL. This concept is further extended to define a single logical address space that can handle multiple SGL lists, and SGL buffer fragments that can reside in multiple physical memory spaces as well.

Figure 3:
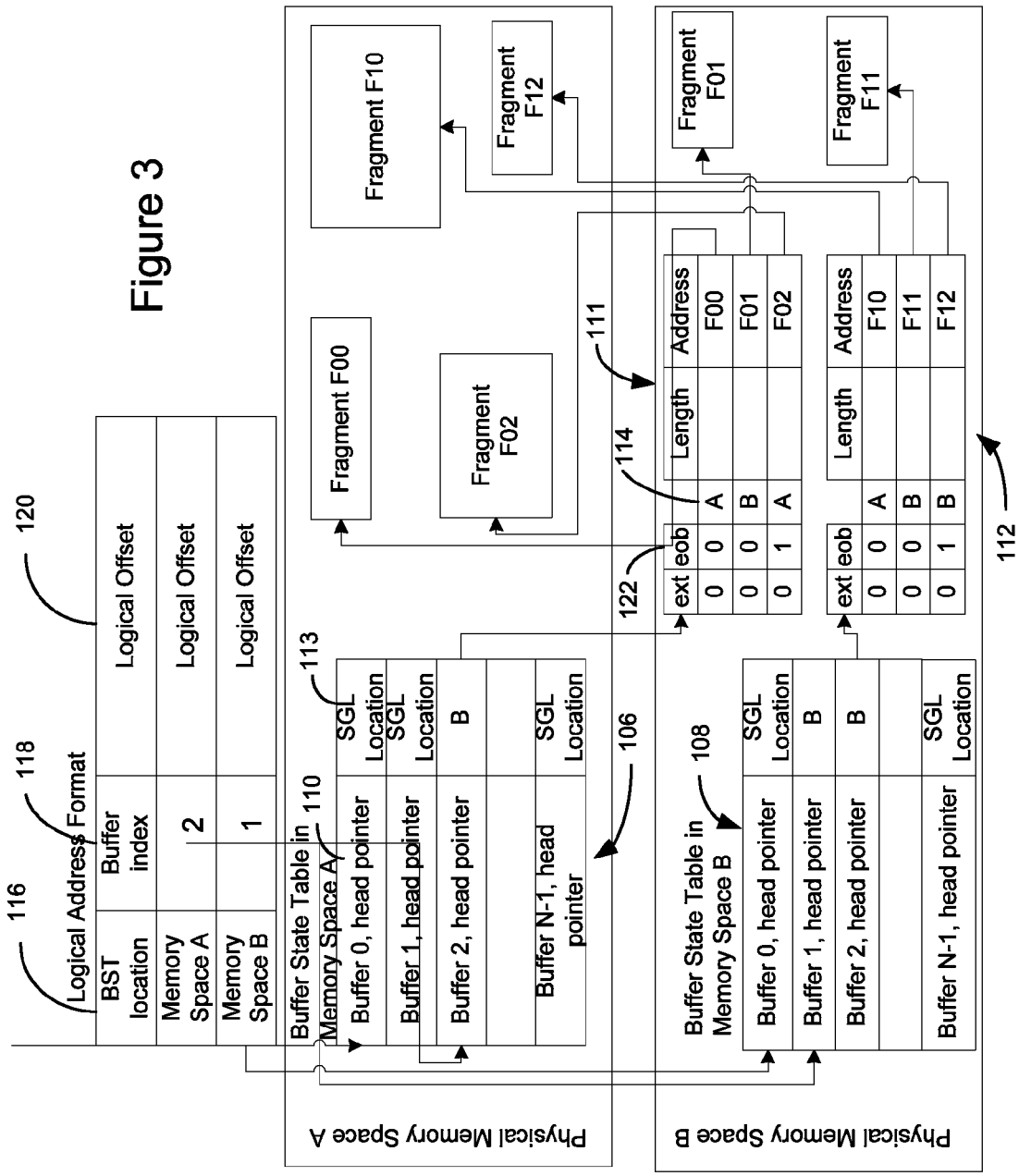
FIG. 3 illustrates logical to physical address translation in multiple memory spaces according to an embodiment of the present invention.

FIG. 3 illustrates the mapping from logical address to physical address in multiple memory spaces. In this example, only two independent memory spaces (A and B) are shown. However, this is not intended to be limiting in any way, and, as will be apparent to anyone of skill in the art, the invention can be extended to more than two independent memory spaces. Examples of separate memory spaces can be, for example, a DDR DRAM memory space, a PCI host memory space, and a GSM on-chip embedded memory space. To support multiple concurrent SGL lists, embodiments of the present invention introduce a novel data structure called a Buffer State Table (BST). A BST is provided in each memory space, such as BST 106 and BST 108 shown in FIG. 3. The entries in the exemplary BST table 106 hold a head pointer 110 to each independent SGL list 111, 112 (i.e. the address of first element of SGL list), and the memory space location 113 (i.e. which memory space is used) of the SGL entry. Each independent SGL in use occupies one entry of the BST table until the SGL is no longer in use. The present invention allows multiple BST tables to be used concurrently, one in each memory space. This provides the flexibility for size and efficiency trade-off when allocating BST table entries. Each SGL entry or element can be further extended to include an SGL location field 114 that specifies which memory space holds the affected buffer fragment. This allows a single SGL to mix buffer fragments from different memory spaces.

A logical address format for descriptors is also shown in FIG. 3. The logical address contains multiple fields, including the BST location 116 that specifies the memory space in which to find the BST table, the buffer index 118 that specifies which entry of the BST corresponds to the data buffer in operation, and the logical offset 120 that indicates the logical offset address within one SGL buffer of the DMA, based on the logical offset to physical address mapping scheme explained in relation to FIG. 2.

Note that the eob field 122 in the SGL entry is used to mark the end of the SGL buffer. According to embodiments of the present address translation method, if a transfer exceeds the total length of all fragments combined in an SGL, the DMA engine can check the buffer over-flow condition and signify an error condition.

Note that although the SGL location field is specified as part of the BST entry, in alternative embodiments, the SGL location field can also be part of the logical address, as an additional field of the DMA descriptor. The purpose of the field still remains to identify the memory space in which the SGL is located. Similarly the fragment location field can be moved to the BST entry, logical address, or the DMA descriptor, although this could potentially limit the flexibility of mixing the buffer fragments from different memory spaces in a single SGL.

In summary, from a user's perspective, to make use of the logical address model proposed by the present invention, the following steps are necessary in this embodiment:
1. At system initialization, BST tables are set up in the desired memory spaces.
2. When an SGL list is created for use, the SGL entries are created in the desired memory spaces, pointing to the buffer fragments allocated in the desired memory spaces. An empty entry in the BST table needs to be allocated, and the head pointer of the SGL is placed into the allocated entry. From this point on the logical buffer as represented by the SGL is added to the DMA system for further usage. Each logical buffer in the BST table is called an active logical buffer.
3. The DMA master can create one, or multiple, DMA descriptors that specify data movement using the logical address corresponding to one or multiple active logical buffers. The DMA transfer can start from any arbitrary logical address of an active logical buffer, and end with any arbitrary logical address of the logical buffer as long as it does not exceed the total logical buffer length. Multiple DMA transfers using independent active logical buffers can be intermixed or executed concurrently, without interfering with the address translation of each other. Step three can be repeated as many times as required.
4. When all the desired data transfer using an SGL buffer (active logical buffer) is completed, the master can release the BST entry back to an unused pool. This completes the life cycle of the logical buffer affected, and the affected SGL can no longer be used by the DMA engine.

Concurrent Channels and Queue Organization

As noted in the background, existing implementations of DMA channel and queue organization in known DMA systems do not take advantage of the concurrent nature of modern system buses. Concurrency exists among multiple buses that can be operated at the same time, as well as on data buses that support independent bi-directional transfers (for read/write at the same time without sharing bus bandwidth). In certain designs, even when the buses can be operated concurrently, the queue structure causes head of line blocking and hampers the DMA engine from achieving maximum concurrent transfers across all the system buses.

Figure 4:
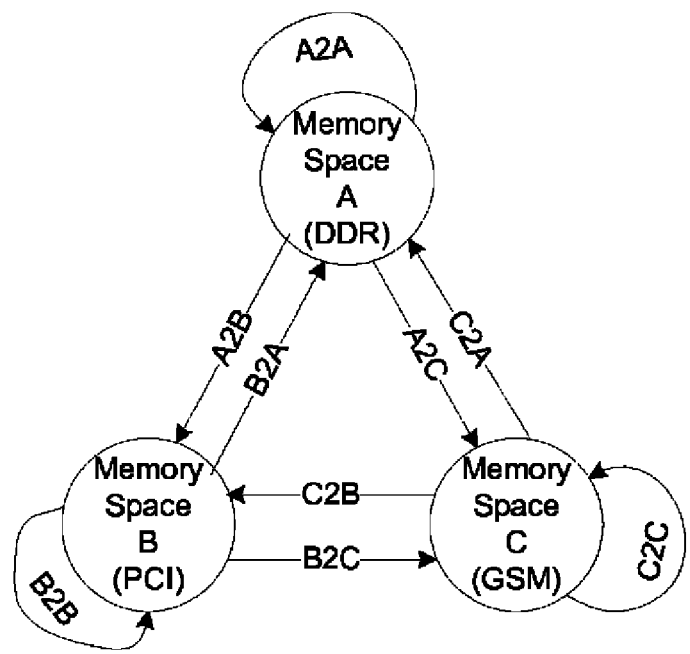
FIG. 4 illustrates a DMA channel organization based on transfer direction (single priority) according to an embodiment of the present invention.

Embodiments of the present invention organize DMA channels according to the direction of data transfer. An example given in FIG. 4 illustrates the organization of DMA channels for a DMA engine that can handle three independent concurrent memory spaces, wherein each memory space can support independent concurrent read and write access in a concurrent or shared manner. The three independent memory spaces are denoted as A, B and C. In a preferred embodiment, memory spaces A, B and C represent a DDR DRAM memory interface, a PCIe memory interface, and an on-chip shared memory (GSM) memory space, respectively. In the preferred embodiment, the DDR memory interface controller provides separate internal read and write bus interfaces, such as AXI read and write channels, that can be operated in parallel, although the actual access to the DDR DRAM utilizes the shared DDR bus to the external memory. The PCIe controller provides independent internal read and write bus interfaces, and the actual PCIe bus interfaces does support concurrent read/write full duplex access due to the use of independent receive and transmit physical links on the bus. The on-chip shared memory controller provides concurrent read and write bus interfaces that can operate simultaneously.

Embodiments of the present invention exploit the parallelism that exists on these concurrent read and write ports on the separate memory interfaces to achieve high data transfer throughput. For example, the PCIe read port can supply read data that can be transferred into the GSM write port, while the GSM read port can supply data into the DDR write port. Such transfers can happen in parallel without interference among each other. Hence the present invention divides the DMA channel based on the principle of data transfer direction. As illustrated in the diagram, each node (A, B, C) in the diagram represents an independent memory interface, and each directed arc between a source node and a sink node represents the direction of the transfer, where the source node represent the source of data, and the sink node represents the destination of the transfer. In the example of three memory spaces, there are total of nine transfer directions:

A2A: transfer data from memory space A to memory space A

A2B: transfer data from memory space A to memory space B

A2C: transfer data from memory space A to memory space C

B2A: transfer data from memory space B to memory space A

B2B: transfer data from memory space B to memory space B

B2C: transfer data from memory space B to memory space C

C2A: transfer data from memory space C to memory space A

C2B: transfer data from memory space C to memory space B

C2C: transfer data from memory space C to memory space C

Each direction-based DMA channel handles data for a particular direction of data movement. And all the direction-based DMA channels can be executed in parallel. At any given time, any subset of the nine direction-based DMA channels can be active simultaneously. When the active DMA channels do not overlap with each other (i.e. each node has <=1 active arc departing, and each node has <=1 active arc arriving), then the active DMA channels have access to the full source and sink memory space (whichever has lower throughput will get saturated). For example, if A2A, B2C, C2B are active at the same time, all three channels can operate at the full speed to saturate their respective source or sink ports. If the active channels share the same source or sink memory space, the DMA engine can provide arbitrated access among the active channels at the contended read or write port to ensure the bandwidth of the contended port is shared based on desired policy, as will be discussed below in greater detail.

Figure 5:
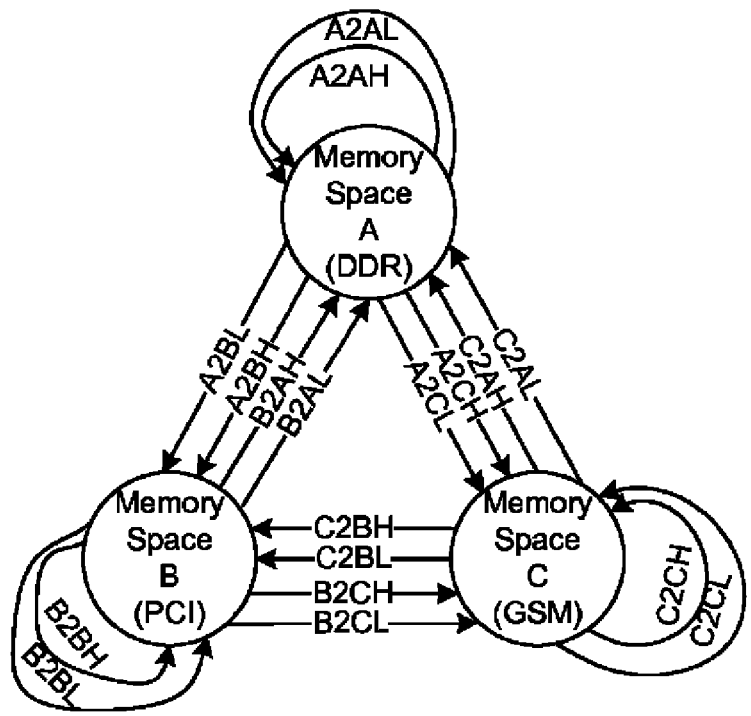
FIG. 5 illustrates DMA channels based on transfer direction (dual priority) according to an embodiment of the present invention.

FIG. 5 further extends the idea of direction-based DMA channel partitioning to support a plurality of channels per direction of transfer. In the example shown, two channels are provided per direction as represented by the H and L suffixes in the channel label, corresponding to high priority and low priority channel on each direction. For example:

A2BH: transfer high priority data from space A to space B

A2BL: transfers low priority data from space A to space B

It should be noted that the concept of multiple channels per direction is not limited to two channels; more channels can be provided based on system requirements. Nor is the policy for channel arbitration limited to priority based schemes, other arbitration policies such as round-robin, weighted round robin, priority round-robin or other scheduling policies can be applied among channels of the same direction.

The purpose of providing multiple channels per transfer direction is to allow different Quality of Service (QoS) of DMA transfers to be provided at the same time. For example, the lower priority channels can be used to execute bulk data movement of large byte count, while the high priority channels can be used to execute latency sensitive movement of small control messages. Without the additional high/low priority channels, if both types of data movement are mixed in the same DMA channel, a smaller control message movement can get stuck behind a large bulk data movement that has already been started when the request for a smaller transfer is made, hence the smaller transfer will suffer the long latency of waiting for the current larger transfer to complete. With separate channels, the small movement can be started right away and the access interleaved with the data movement of the larger bulk transfer.

Given the concurrent nature of DMA channels provided by the present invention, it is important to organize the DMA request queues appropriately to maximize the parallelism in this architecture. Known DMA structures utilize shared request queues, or request queues organized based on priority, but without the concept of request queues organized based on transfer direction. Such designs can easily cause Head of Line (HOL) blocking that results in low system throughput. For example, if a shared request First Come First Serve (FCFS) queue is used to post DMA requests regardless of direction of transfer, a request sequence of Req1(A2B), Req2(A2B), Req3(C2A), Req4(B2A) can be posted sequentially. Req1 is then fetched first and dispatched to channel A2B, Req2 is then fetched, but is blocked because channel A2B is already busy, hence Req3 and Req4 are also blocked until Req1 is completed even though Req3 and Req4 do not utilize the blocked channel A2B, and should be able to proceed without blockage. However, due to the shared queue, the HOL blocking condition causes Req3 and Req4 to be delayed and the efficiency of DMA is lower.

In embodiments of the present invention, the request queues are organized based on the direction of transfer. In a DMA structure with multiple channels per direction, each channel can have its own independent request queue. In other words, each DMA channel is organized based on direction and Quality of Service (QoS) schemes, and the request queues are organized independently for the parallel channels. For example, in the present per-direction queue structure, Req3 and Req4 can each posted to their own queues because they belong to different transfer directions. Hence Req1, Req3, Req4 can be executed in parallel, and Req2 can be executed after Req1 is completed.

There are a number of methods for data structure organization of the request queues, including linked lists that chains the DMA descriptors together for each queue. Embodiments of the present invention can utilize the linked list based method. According to a presently preferred method, the DMA request queues are organized based on hardware system FIFOs that are globally accessible by all bus masters in a SOC.

Embodiments of the present invention support two schemes of communication between a DMA requestor (master) and a DMA engine. The two schemes are all based on GSM FIFO queues. Each set of GSM FIFO is organized as either two or three FIFOs sharing the same ring buffer space. Each scheme of communication provides different capabilities and requires a different number of processing steps for communication.

The first scheme is a two-stage FIFO communication method. This method is used when the DMA master does not need an indication of DMA operation completion, and there can be multiple DMA masters sharing the same DMA queue. Therefore no master has sufficient information to keep track of the queue occupancy. Hence it is necessary to provide flow control indication to ensure the DMA queues do not suffer from FIFO overflow/underflow.

Figure 6:
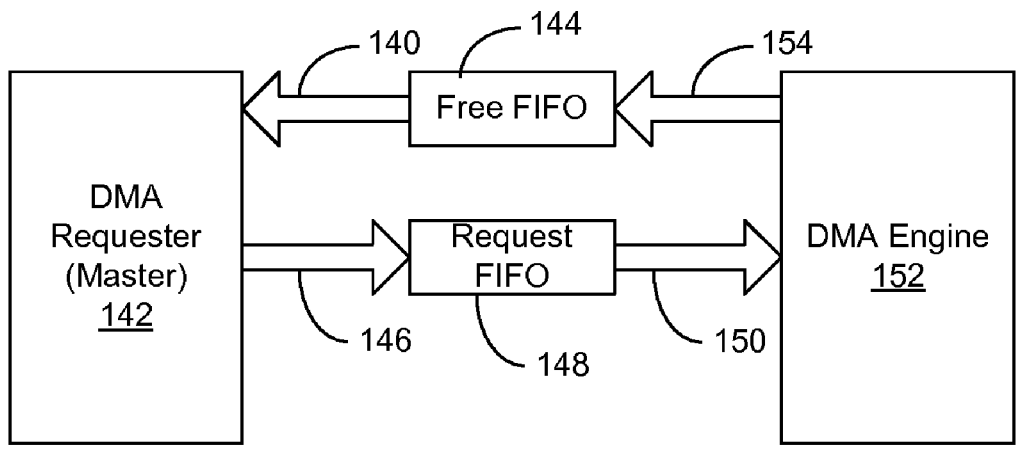
FIG. 6 illustrates a two-stage DMA queue communication scheme (Free-Request) according to an embodiment of the present invention.

Referring to FIG. 6, the process of communication of the first scheme is shown. As indicated by arrow 140, before a DMA master 142 makes a DMA request, it checks if the Free FIFO 144 is empty, if the FIFO 144 is empty, the master 142 has to wait for the FIFO 144 to become not empty. When the Free FIFO 144 is not empty, the master 142 reads a free pointer from the free queue, which allocates an unused DMA descriptor for use by the DMA master. As indicated by arrow 146, the DMA master 142 fills the allocated DMA descriptor with the information about the DMA request, and writes the pointer to the Request FIFO 148. This puts the request into the request queue. As indicated by arrow 150, the DMA engine 152 then detects the request queue is not empty indicating there is an outstanding DMA request to process. The DMA engine 152 then reads the request pointer from the request FIFO 148. The request pointer points to the DMA descriptor on the top of the queue. The DMA engine 152 then processes the DMA request to execute the data movement requested. As indicated by arrow 154, upon completion of the DMA data movement, the DMA engine 152 writes back the current request pointer to the Free FIFO 144. This completes the DMA operation, the present pointer and the associated descriptor is now returned to the free pool.

Figure 7:
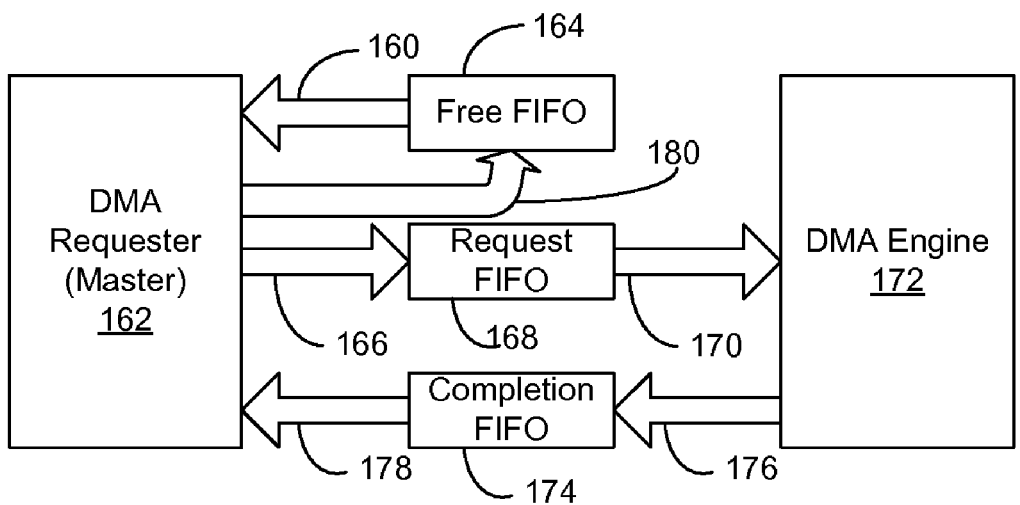
FIG. 7 illustrates a three-stage DMA queue communication scheme according to another embodiment of the present invention.

The second scheme is a three-stage FIFO communication method. The three stage method allows multiple DMA masters to share the same set of queues, yet provides flow control and completion indication for each DMA request to the DMA master. The flow of the second scheme is shown in FIG. 7.

As indicated by arrow 160, before a DMA master 162 makes a DMA request, it checks if the Free FIFO 164 is empty. If the FIFO 164 is empty, the master 162 has to wait for the FIFO to become not empty. When the Free FIFO 164 is not empty, the master 162 reads a free pointer from the free queue, which allocates an unused DMA descriptor for use by the DMA master 162. As indicated by arrow 166, the DMA master 162 then fills the allocated DMA descriptor with the information about the DMA request, and writes the pointer to the Request FIFO 168. This puts the request into the request queue. As indicated by arrow 170, the DMA engine 172 detects the request queue is not empty indicating that there is an outstanding DMA request to process. The DMA engine 172 then reads the request pointer from the request FIFO 168. The request pointer points to the DMA descriptor on the top of the queue. The DMA then process the DMA request to execute the data movement requested. Upon completion of the DMA data movement, the DMA engine 172 writes back the current request pointer to the Completion FIFO 174, as indicated by arrow 176. This completes the DMA operation, and provides indication of the DMA completion of the present descriptor to the DMA master 162. As indicated by arrow 176, the DMA master 162 detects the DMA completion FIFO 174 is not empty through polling, interruption of hardware thread event. It reads the completion pointer from the completion FIFO 174, which points to the associated descriptor that has just been completed. The master 162 then takes the required processing steps associated with the completion event, including, but not limited to, checking the DMA completion status, as indicated by arrow 178. As indicated by arrow 180, once post-processing of the DMA completion event is done, the master 162 then writes the present completion pointer back to the free FIFO 164. The current pointer and the associated descriptor are now returned to the free pool.

Note that the in addition to the pointer to DMA descriptor, the data structure written into the Free/Request/Completion FIFOs can be extended to include Request Valid flag, DMA success Flag, and/or application tag whose value is preserved and relay by the DMA between the FIFOs during the DMA processing.

Figure 8:
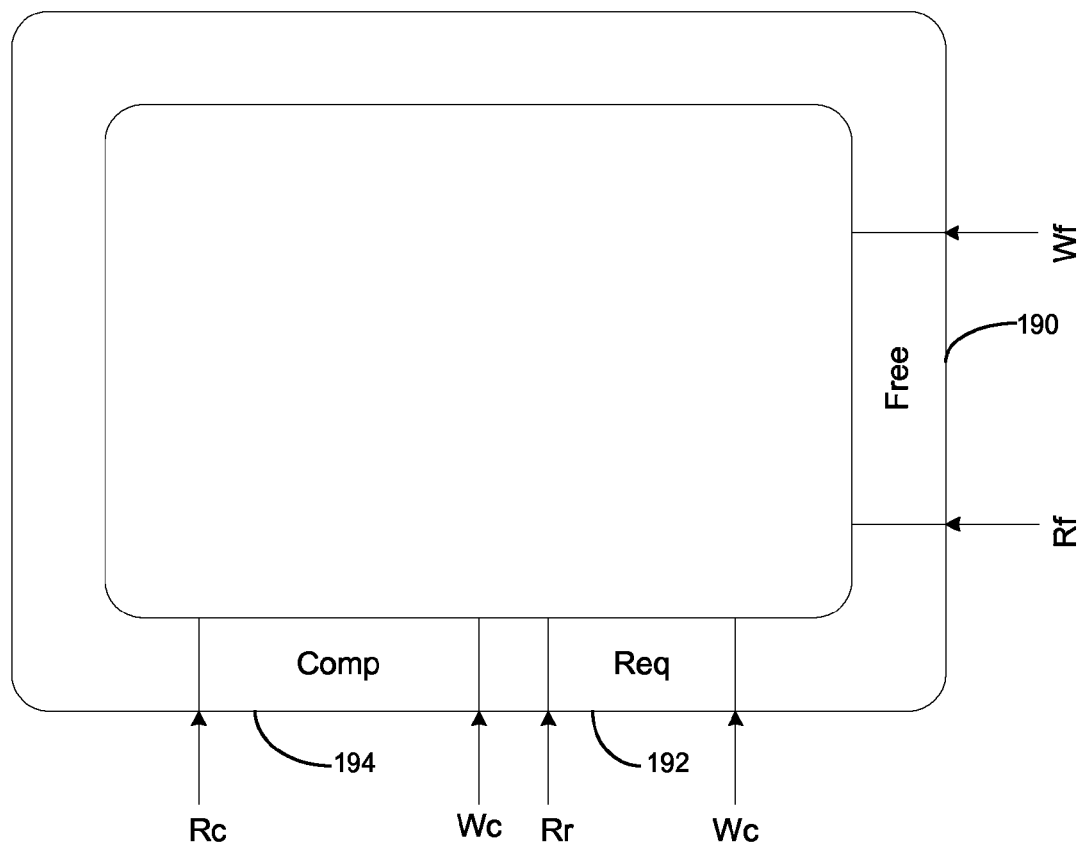
FIG. 8 illustrates sharing of ring buffer space of three sets of FIFOs in the queue according to an embodiment of the present invention.

In the above described FIFO communication schemes, the descriptor pointers cycle among the Free/Request/Completion FIFOs at different stages of a descriptor processing. Following the communication protocol, a pointer can only exist in one of the two- or three-stage FIFOs. In other words, the same pointer cannot exist in two FIFOs at the same time. This enables a novel scheme of ring buffer organization to implement the two- or three-stage FIFOs. The two- or three-stage FIFOs can share the same ring buffer space and just using two or three sets of pointers to implement the FIFOs. This results in 2× or 3× savings in buffer space depending on which communication scheme is used. FIG. 8 illustrates a DMA queue set with three FIFOs (Free/Request/Complete) 190, 192 and 194 sharing the same ring buffer space.

SGL Caching

Figure 9:
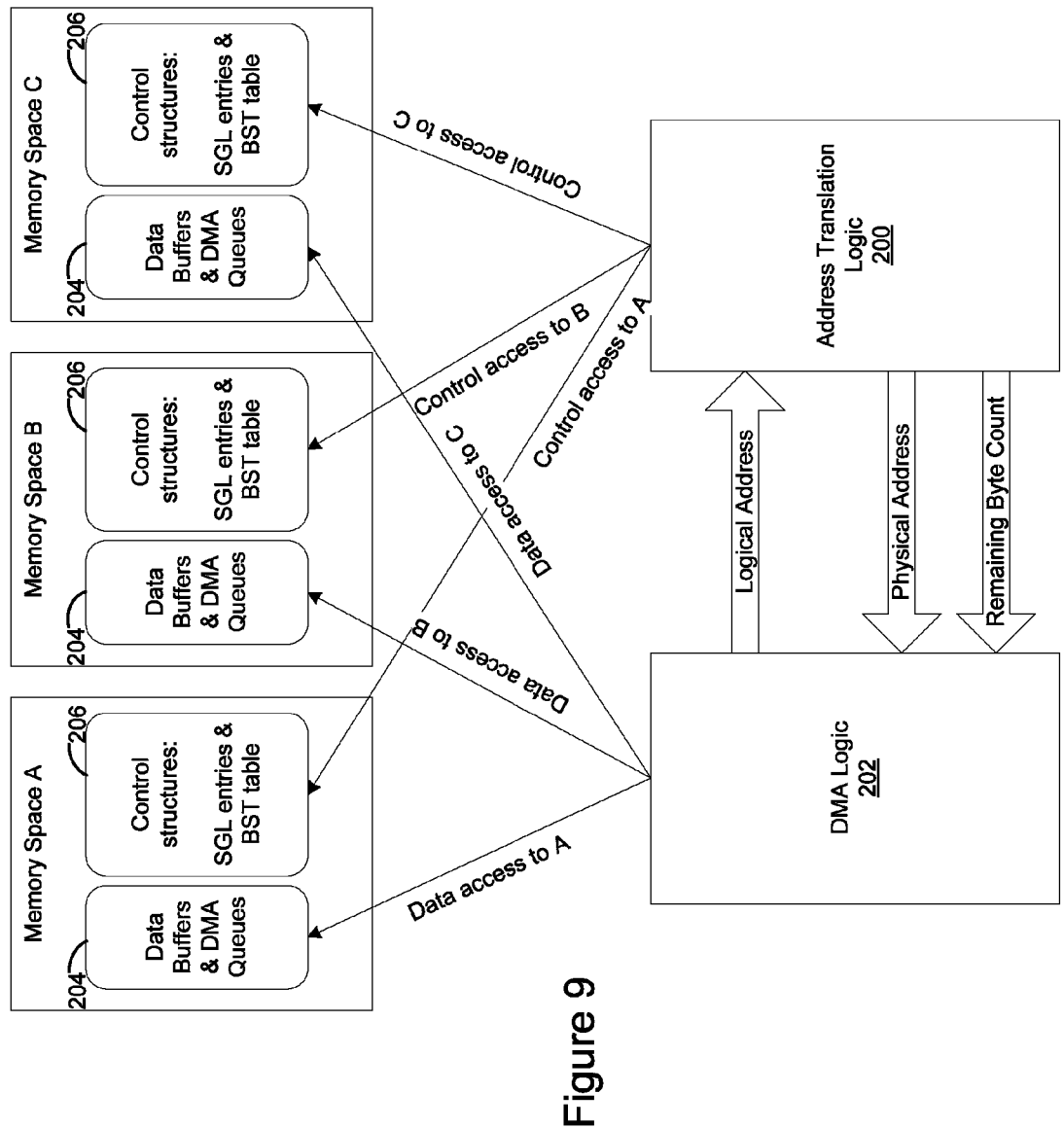
FIG. 9 illustrates partition of DMA logic from the address translation logic according to an embodiment of the present invention.

The address translation method described earlier defines the mapping between logical address and physical address. Embodiments of the present invention can utilize an architecture where the address translation logic 200 is separated from the DMA engine 202 as an independent subsystem, as illustrated in FIG. 9. Such partitioning allows for implementation flexibility of the address translation logic.

It is worth noting that because there can be multiple memory spaces (e.g. A, B, C), the DMA logic 202 and the address translation logic 200 both need to have access to all the memory spaces independently, as shown by the line arrows. The accesses to the same memory space from the DMA engine 202 and address translation logic 200 need to be arbitrated in an appropriate way that is outside the scope of the present invention. The DMA logic 202 accesses the DMA queues and the data buffer fragments 204 in a memory space, while the address translation logic 200 accesses the control structures 206 that support logic to physical address mapping including the BST tables and the SGL entries.

Embodiments of the present invention partition the DMA logic 202 from the address translation logic 200 by defining a novel, yet simple, interface between the two sub-blocks. The key signals are shown in block arrows. As defined from the DMA logic point of view, the signals are:

Logical Address (output): this signal indicates the value of logical address the DMA engine 202 wishes to translate.

Physical address (input): this signal provides the physical address translated from the logical address by the address translation logic 200.

Remaining Byte Count: This signal indicates how many bytes there are in the present SGL buffer fragment starting from the present physical address to the end of the fragment.

By utilizing the physical address (PA) and the remaining byte count (RBC) information, the DMA logic has all the information necessary to perform DMA data movement based on SGL fragments. The interface can be extended to support pipelining of multiple outstanding address translation requests, and signals can be added to indicate the validity of the requests and the translation results, as well as translation errors such as buffer overrun.

One implementation of the address translation logic is a context-free translation scheme. Given any logic address (LA) to be translated, the address translation logic (ATL) traverse the BST table, and the SGL list and chains, accumulating the byte count of the traversed SGL entries as the present logic address location, until the entry that matches the requested LA is reached. Then the ATL can calculate the corresponding PA and RBC based on the current SGL entry, and the PA/RBC are returned as the translation results. Such an approach, albeit simple, is time consuming and requires the full traversal of the SGL BST and SGL list that consumes memory bandwidth. Such a process is called full traversal translation procedure (FTTP).

Embodiments of the present invention advocate caching techniques to reduce the occasions where FTTP is required in order to speed up the translation as well as reducing the memory bandwidth consumed in the translation process. The basic concept is to keep track of a small number of active SGL entries and the LA to PA mapping that has been recently accessed. Based on temporal locality (if a SGL has been accessed recently, there is a good chance the same SGL buffer be accessed again in the near future), and spatial locality (the future access to a SGL buffer will likely have LA that is adjacent, most likely immediately following, the LA within the SGL that has been accessed last). The details of an SGL cache organization for ATL is described in a co-pending U.S. application Ser. No. 12/203,455, filed Sep. 3, 2008 and entitled "Address Translation Scheme And Cache With Modified Scatter Gather Element", which is incorporated herein by reference.

Crossbar Switch Based DMA Datapath

Figure 10:
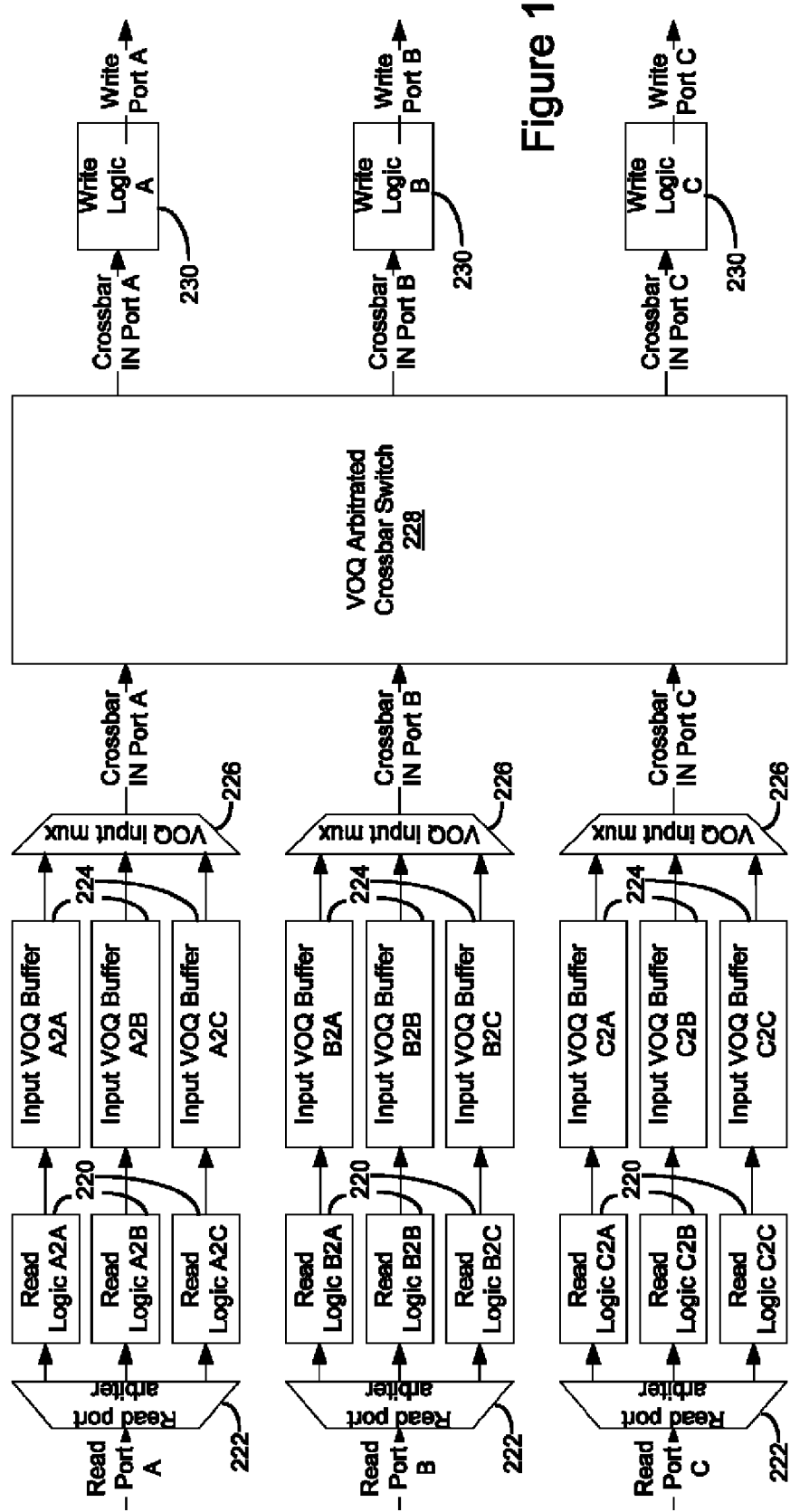
FIG. 10 illustrates a crossbar switch-based datapath according to an embodiment of the present invention.

As described earlier, embodiments of the present invention support the current channels in independent directions of data movement. To support the concurrent operations of the channels, the present invention can utilize a novel crossbar switch based DMA datapath. Such a datapath is illustrated in FIG. 10. The datapath diagram corresponds to a design with nine per direction concurrent channels as shown in FIG. 4. The same structure can be extended to support designs with different memory spaces and different channelization by organizing a VOQ input buffer for each concurrent DMA channel. The arrows in the diagram correspond to flow of data movement. The independent read ports are used to generate read access to the source memory spaces to supply the source data. The read logics 220 are organized based on the direction-based DMA channels. DMA channels sharing the same source port are grouped together via a read port arbiter 222 that is responsible for arbitrating the concurrent read accesses from the active DMA channels contended to read the source data from the same memory space. The read data returned to each DMA channel is then directed towards an input data buffer 224 that is organized on a per channel basis. This buffer is also referred to as Virtual Output Queue (VOQ) data buffer which is a commonly used structure in crossbar switch architectures. The VOQ data buffers 224 are organized on per input/output pair, and in some cases can be further divided based on the sub-channels sharing the same input/output direction for QoS purpose. Signals from the VOQ data buffers 224 are multiplexed from each read port by VOQ input multiplexers 226, and provided to a VOQ arbitrated crossbar switch 228.

It is a well known technique to use a combination of VOQ data buffer and crossbar switch with VOQ arbiter to achieve non-blocking data transfer between input and output ports of the crossbar. Embodiments of the present invention adopt commonly used switch fabric design techniques and apply them in combination with the read port arbiter 222, read port logic 220 and the write port logic 230 to achieve non-block concurrent operation of DMA channels. There are also a large number of VOQ crossbar switch arbitration techniques, as are known to those of ordinary skill in the art. Embodiments of the present invention can utilize these existing arbitration techniques for cross bar arbitration.

The application of known crossbar arbitration techniques requires the crossbar data transfers to be divided into fixed time slots, corresponding to fixed data cell size so that all ports can operate in lockstep based on a fixed time scale. Due to the speed differences of the different memory spaces, applying fixed time slot techniques requires a certain amount of output buffer for rate adaptation, and for adaptation of between the different native burst sizes.

Figure 11:
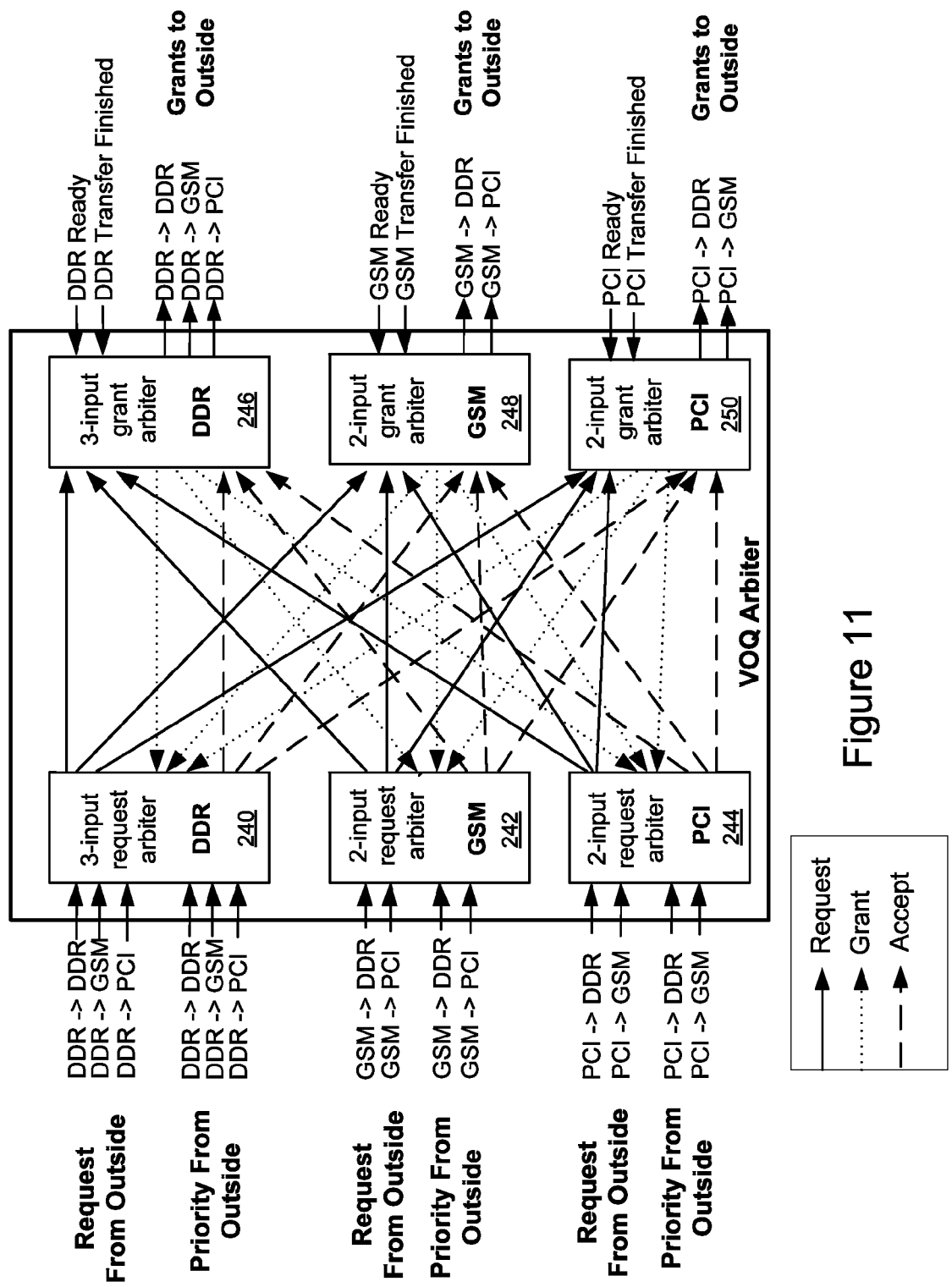
FIG. 11 illustrates a virtual output queue arbiter according to an embodiment of the present invention.

Embodiments of the present invention further permit a novel arbitration scheme that is not based on fixed time slots for data transfer. FIG. 11 shows the hardware implementation diagram for a novel VOQ arbiter. The illustrated VOQ arbiter includes three request arbiters 240, 242 and 244 and three grant arbiters 246, 248 and 250, for the inputs and outputs of channels associated with three physical memory spaces, here shown as DDR, GSM and PCI channels. The requests from outside indicate if the input buffers have data to transfer (non-empty). The priority signals from outside indicate if the input buffers are require higher priority treatment for starvation prevention. The priority signal is set if the buffer is full, and if the buffer contains the last block of a transfer. For example, for 10K-byte transfer, the DMA breaks it into 10 blocks of 1K-byte each. When the 10th block is in the buffer, the LAST signal is set. The grants to outside are the grant signals to the DDR, GSM and PCI channels. After the arbitration is done, these grants are set high to indicate the link that won the arbitration. The signals between request arbiters 240, 242 and 244 and grant arbiters 246, 248 and 250 are internal signals. Solid arrows designate internal request signals. Dotted line arrows designate internal grant signals. Hashed line arrows designate internal accept signals.

Figure 12:
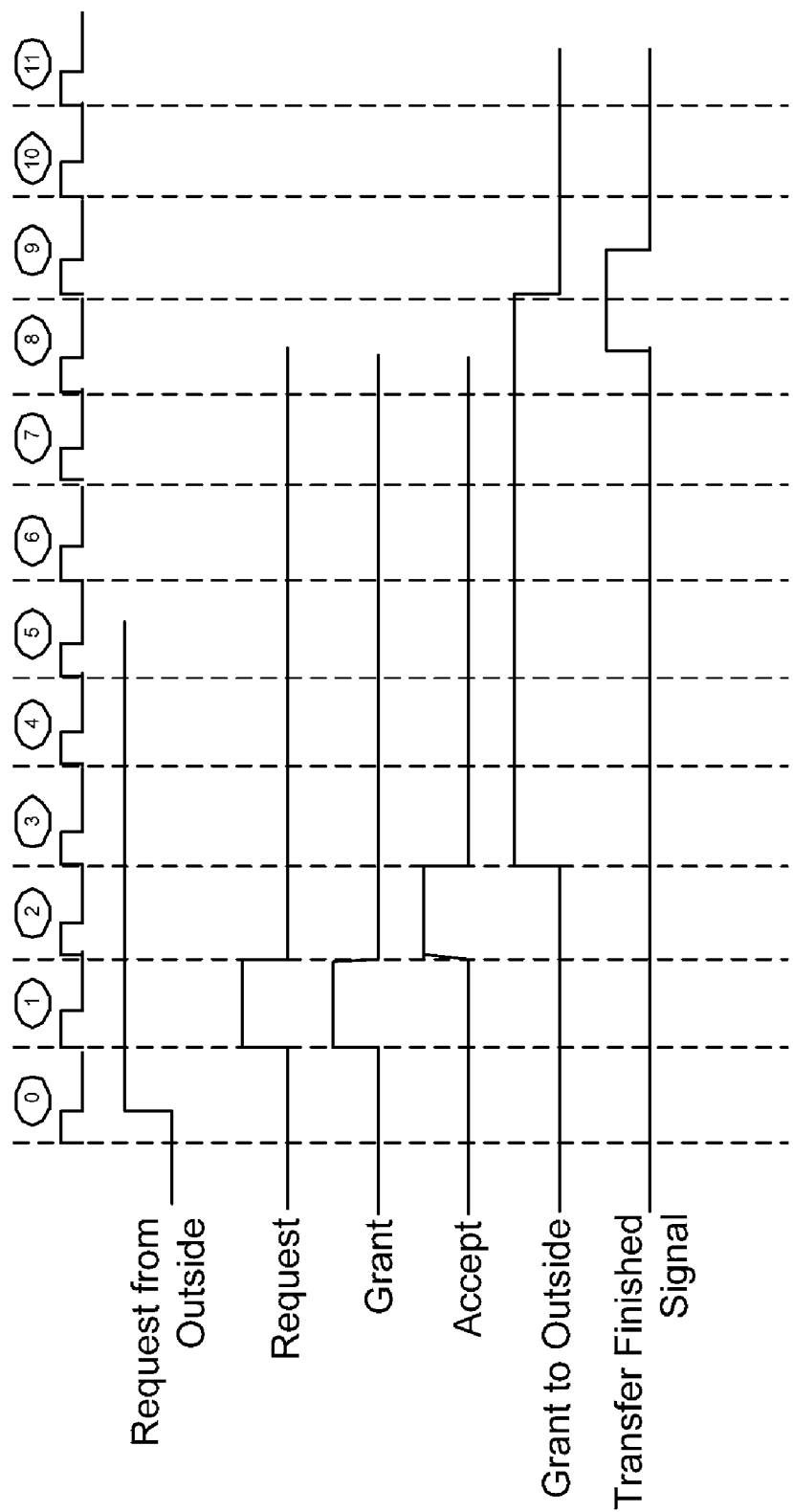
FIG. 12 illustrates an arbiter timing diagram according to an embodiment of the present invention.

FIG. 12 shows the timing diagram for the arbitration process. In cycle 0, the outside request is set. In cycle 1, the internal request is sent from the request arbiter to the corresponding grant arbiter. For example, if outside request DDR to GSM is high, internal request DDR to GSM is set as high, which is one input signal to the two-input grant arbiter for GSM. If more than one outside request is high, all the requests are sent to the corresponding grant arbiter. The grant arbiter responds with a grant signal. If more than one request of a grant arbiter is high, the grant arbiter chooses one according to a current Round-Robin pointer value. In cycle 2, the request arbiter sends out accept signals. If more than one grant is received by the request arbiter, the request arbiter only accepts one grant according to current Round-Robin pointer value. If the request arbiter did not receive any grant from the grant arbiter in the previous cycle (cycle 1), it does not send accept signal. Instead, it continues sending request signals. In cycle 3, if the grant arbiter receives an accept, the grant to outside is set as high. The connection is setup, until a "transfer finished" signal terminates the connection after transfer is complete (e.g. in cycle 8-9 in the diagram). The read signal is sampled at cycle 1. If the output port is not ready, the grant arbiter will not assert the grant signal.

Port Trunking

Figure 13:
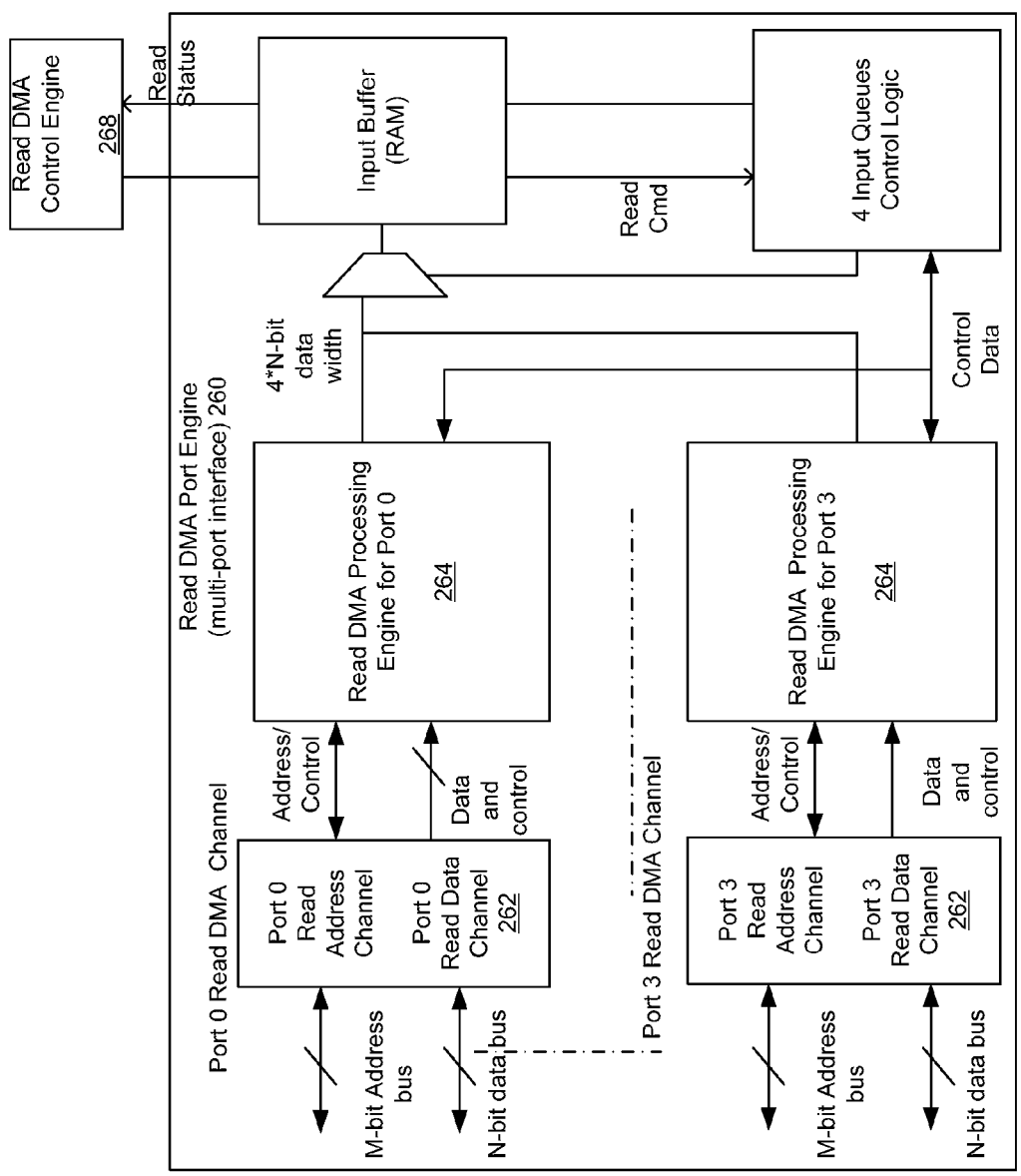
FIG. 13 illustrates port trunking on a source port according to an embodiment of the present invention.
Figure 14:
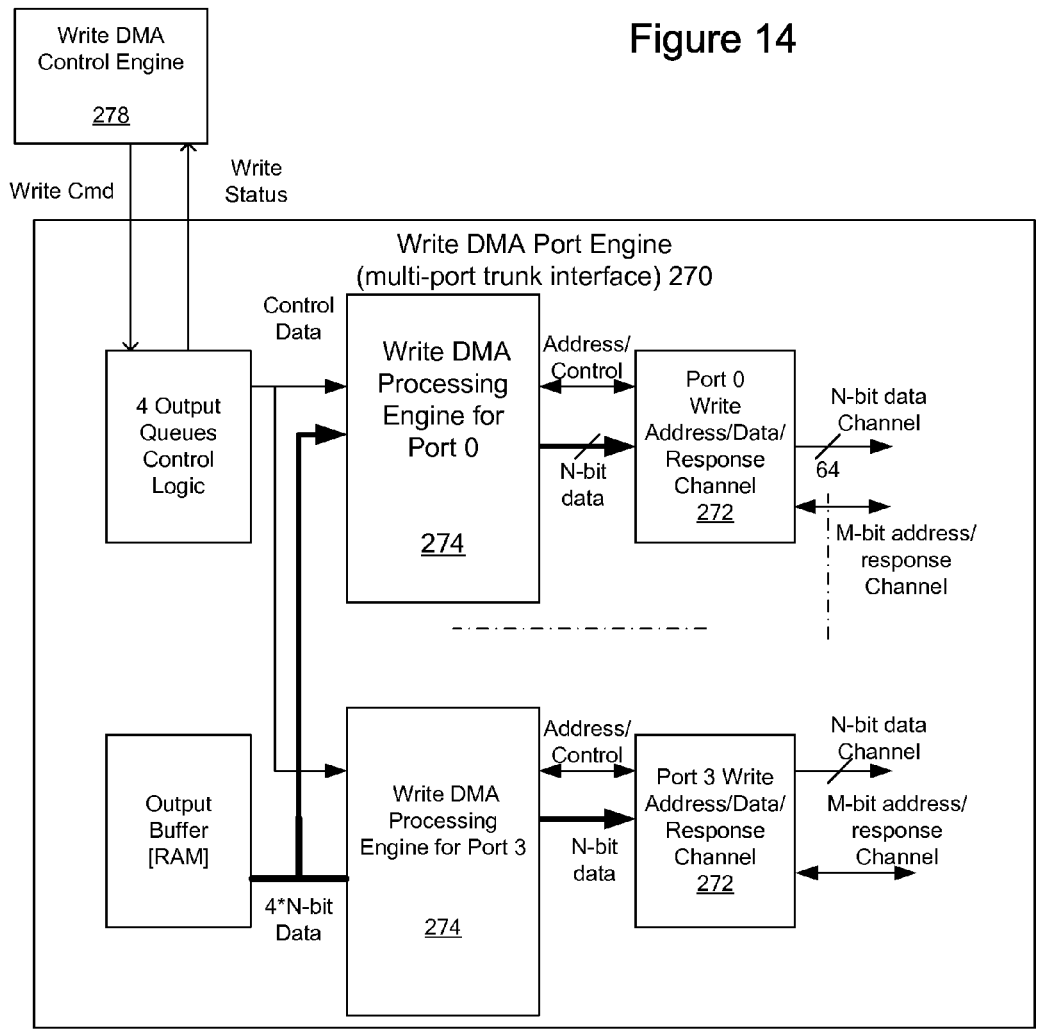
FIG. 14 illustrates port trunking on a sink (destination) port according to an embodiment of the present invention.

The throughput of existing DMA engines is restricted by the speed of individual physical ports of the memory space. The data transfer by such DMA engines is sequentially pipelined to read or write to the memory space using the respective physical port. Embodiments of the present invention can utilize a novel technique to improve data throughput by providing multiple physical ports to access the same memory space. These physical ports are virtually grouped as a single entity and the data transfer is striped across the ports. Each of the physical ports can potentially serve the same DMA or multiple DMAs depending on the DMA transfer size. The order of the DMA data and completion status is preserved while still attaining higher throughput. An embodiment of the present invention implements port trunking using multiple ports to interface with the read and write ports of the memory space. FIG. 13 and FIG. 14 illustrate on how multiple physical ports are used to read data from a memory space or write data to a memory space using the port trunking scheme.

Referring to FIG. 13, a read DMA port engine 260 has multiple physical ports 262 connected to the same memory space. A preferred embodiment of the invention contains four physical port (Port0 to Port3) accesses to the read interface of the memory space. The read DMA port engine 260 periodically checks whether any of the physical ports are available to process read transactions and re-directs the incoming read DMA command onto the first available physical port. If there are multiple ports available, and if sufficient memory slots are reserved for fetching data from each of these multiple ports, the read DMA port engine 260 can request more read DMA commands and issue them on each of the physical ports. These commands can belong to the same DMA transfer or multiple DMA transfers. The read DMA control engine 268 slices the in-flight DMA of the respective DMA channel, into multiple DMA read commands and issue requests against the port arbiter for grant of access to read DMA port engine 260. The cumulative bandwidth achieved by using this architecture is N*single_port_DMA_performance where N represents the number of physical ports used in DMA transfer.

Referring to FIG. 14, a write DMA port engine 270 has multiple physical ports 272 connected to the same memory space. A preferred embodiment of the invention contains four physical port (Port0 to Port3) accesses to the write interface of the memory space. The write DMA control engine 278 issues requests to the VOQ arbiter for grant of access to write DMA port engine. The write DMA port engine 270 periodically checks whether any of the physical ports are ready to process write transactions. Each write DMA command is striped across the available multiple physical ports. These write DMA commands can belong to the same DMA transfer or multiple DMA transfers. If they belong to the same DMA transfer, the transfer byte count is sliced into multiple DMA write commands and each of this command are concurrently issued on the available DMA destination ports. The cumulative bandwidth achieved by using this architecture is N*single_port_DMA_performance where N represents the number of physical ports used in DMA transfer.

Hole Insertion/Removal

Embodiments of the present invention incorporate a novel feature in the capability to insert or remove holes within the data stream of DMA transfer. In conventional storage or data processing systems, each sub-system inserts or processes data protection information (DPI) fields, such as cyclical redundancy check (CRC) fields, to data received from the interfacing sub-system. As such, each of these sub-systems requires dedicated control logic to process these data holes, the overall system cost increases due to the presence of duplicated logic, and data transfer efficiency is affected. Also, since these data holes can be inserted at different stages of the data transfer, there is no overlapping protection of data, resulting in data corruption. Known DMA engines process these data holes by streaming control information along with the data to indicate whether the data bytes correspond to DMA data or DPI data. The data bus size of such processing engines is typically restricted to 8-byte words and uses single DMA channels. The present invention does not pipeline any control information on a per-byte basis to indicate whether a data byte belongs to a data hole or to the DMA data. Embodiments of the present invention also support hole insertion/removal for multiple concurrent DMA channels with unaligned data transfers, programmable sector sizes and data hole sizes.

Figure 15:
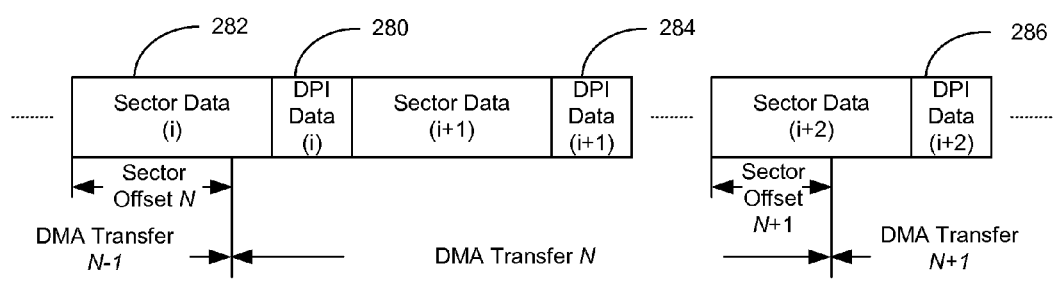
FIG. 15 illustrates data protection information (DPI) insertion/stripping according to an embodiment of the present invention.

FIG. 15 illustrates how data holes 280 containing DPI information are embedded within data formatted as array of sectors similar to disk array memory. This figure shows a DMA transfer, N, and specifies a transfer at SectorOffset-N of SectorData-(i) 282. A DMA transfer could start and end anywhere between the first byte of sector data 282 and the last byte of DPI data 286. One DMA transfer can cross several data sectors and DPI data holes.

Figure 16:
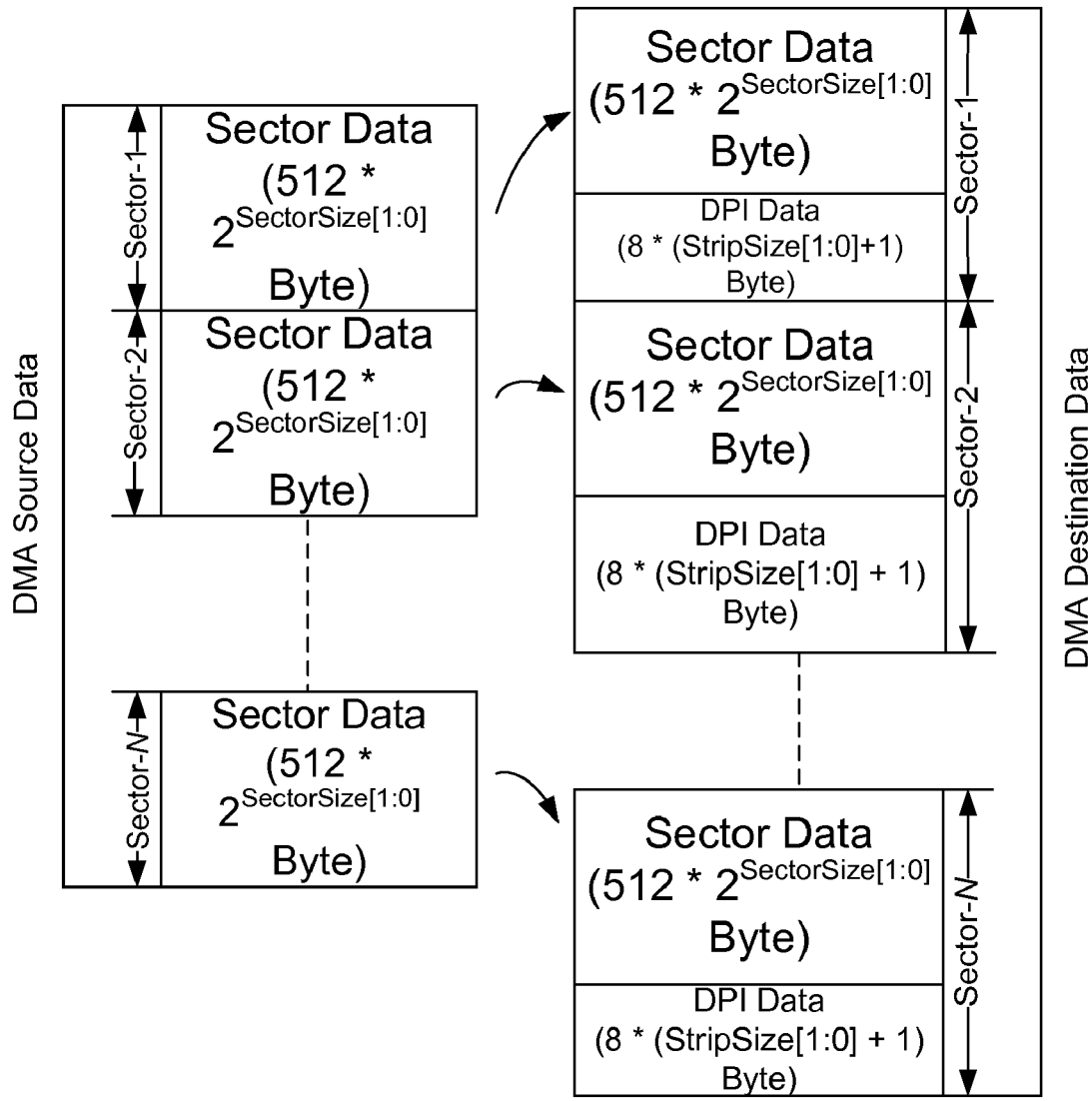
FIG. 16 illustrates DPI data insertion according to an embodiment of the present invention.

In the case of a DMA transfer that includes a Hole Insertion command in the descriptor, the Write DMA Port Engine can perform the function of DPI insertion (Hole Insertion). The positions of the sector data and DPI data are assessed based on the sector offset, sector size and strip size information provided by the write DMA control engine to write DMA port engine. For every write command processed by the write DMA port engine, the offset positions of the hole and sector data are calculated for every write transaction performed across the physical port. Based on these positions, write DMA port engine injects a DPI hole by inserting the appropriate number of all-zeros into the data stream. These DPI bytes are later replaced with CRC bytes of the DMA data. FIG. 16 illustrates data movement when DPI data insertion is selected. At the destination, a memory hole is added to the end of every sector. In this example, the DMA transfer byte count is N*512*2**SectorSize[1:0] Byte. When DPI data insertion is selected, the ByteCount field in the descriptor specifies the valid sector bytes that have been read from the source port.

Figure 17:
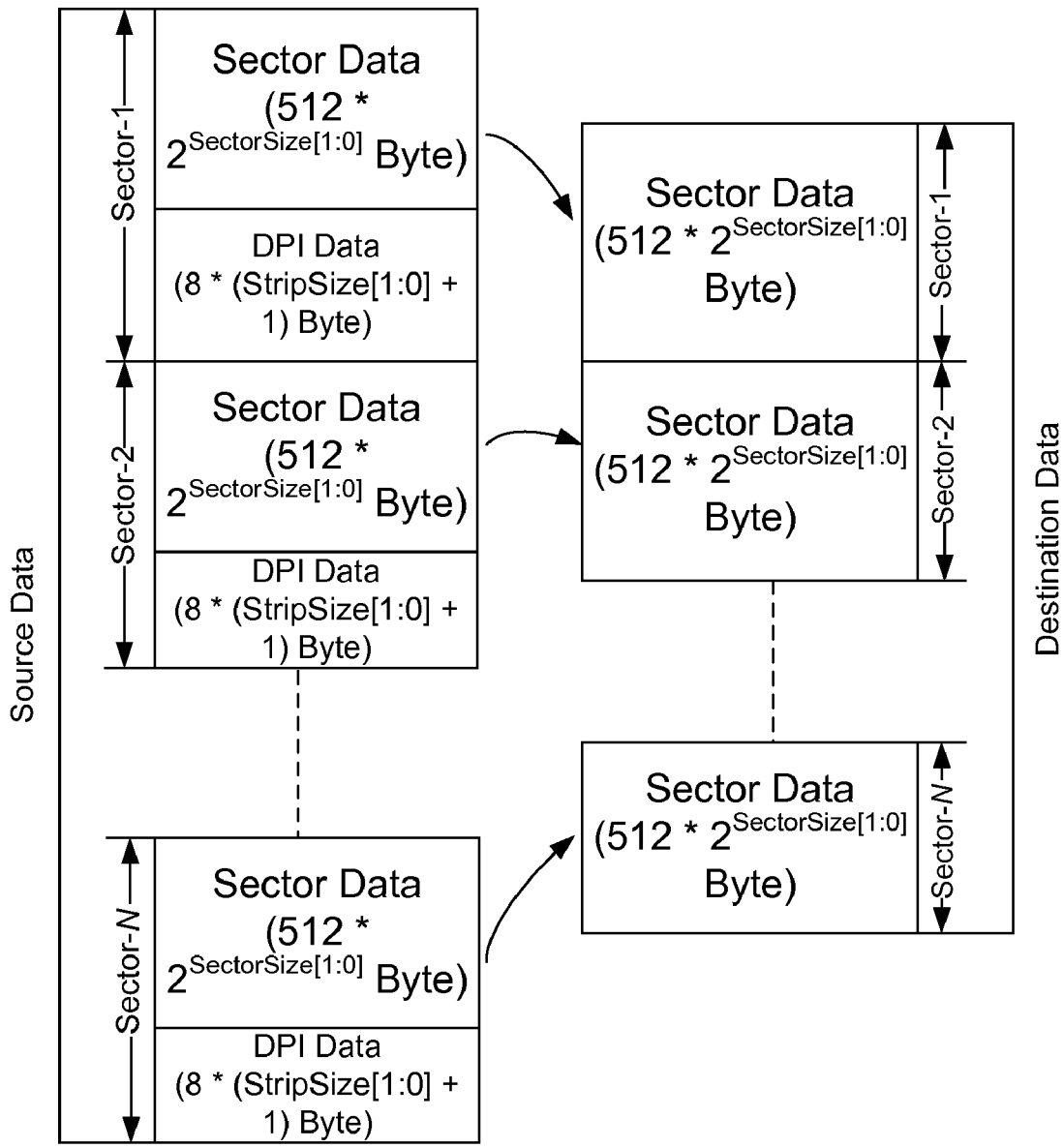
FIG. 17 illustrates DPI data removal according to an embodiment of the present invention.

In case of DMA transfer that includes a Hole Removal command in the descriptor, the read DMA port engine can perform the function of DPI removal (hole removal). The positions of the sector data and DPI data are assessed based on the sector offset, sector size and strip size information provided by the read DMA control engine to the read DMA port engine. For every read command processed by the read DMA port engine, the offset positions of the hole and sector data are calculated for every read transaction performed across the physical port. Based on these positions, the read DMA port engine generates a read strobe signal to indicate valid sector data bytes. Having discarded the hole (DPI) bytes, the sector bytes are then processed by the read DMA engine and stored in the input RAM for DMA transfer. In the case of DMA transfer involving scatter—gather lists, the read DMA port engine has the capability to ignore reading a data fragment that is completely comprised of DPI bytes. FIG. 17 illustrates data movement when DPI data striping is selected. In this example, DMA transfer byte count is N*512*2**SectorSize[1:0] Byte. When DPI data removal is selected, the byte count field in the description specifies the total number of bytes, including the DPI bytes that have been read from the source port.

Endianess Transformation

Data bytes can be ordered in different ways based on the design implementation for a particular application imposed by the transfer protocols. For example, a MIPS processor supports big-endian 32-bit byte ordering while Intel processors in PCs support little-endian byte ordering. Therefore, there exists a discrepancy when dealing with systems using two different byte-ordering schemes. This can be eliminated by re-ordering the bytes prior to transferring data onto destination port or after receiving data from the source port. Most known DMAs operate using a single mode of endian byte-ordering format. Known DMAs, such as that described in U.S. Pat. No. 6,799,232, perform endian conversion after aligning the incoming data on a double word boundary. The present embodiment is not limited by aligning the data before performing endian conversion. It supports any random data transfer whether aligned or un-aligned for various data bus sizes (for example, 256-bit data bus, 128-bit data bus, 64-bit data bus). The incoming data is sent through a data processing engine so as to pack the data appropriately taking into account the different data bus sizes of source read port and sink write port, unaligned addresses, and DPI fields. The processed data is then sent through an endian conversion module. The data is fragmented into bytes and stored in the form of a multi-dimensional array. Depending on the endian translation mode and the desired data bus width, the data from this array is again packed into words or double-words of the appropriate size.

Depending on the width of the data bus, unaligned big-endian data can contain non-contiguous data. Prior art DMA systems do not support data transfer involving non-contiguous data. If the destination port of the DMA transfer is unaligned and involves endian conversion, the first and last transactions of such DMA transfer are usually prone to have non-contiguous data. Embodiments of the present invention have the capability to split the transactions having non-contiguous data into two separate continuous data transactions issuing appropriate address.

Figures 18, 19, 20, 21, 22, 23:
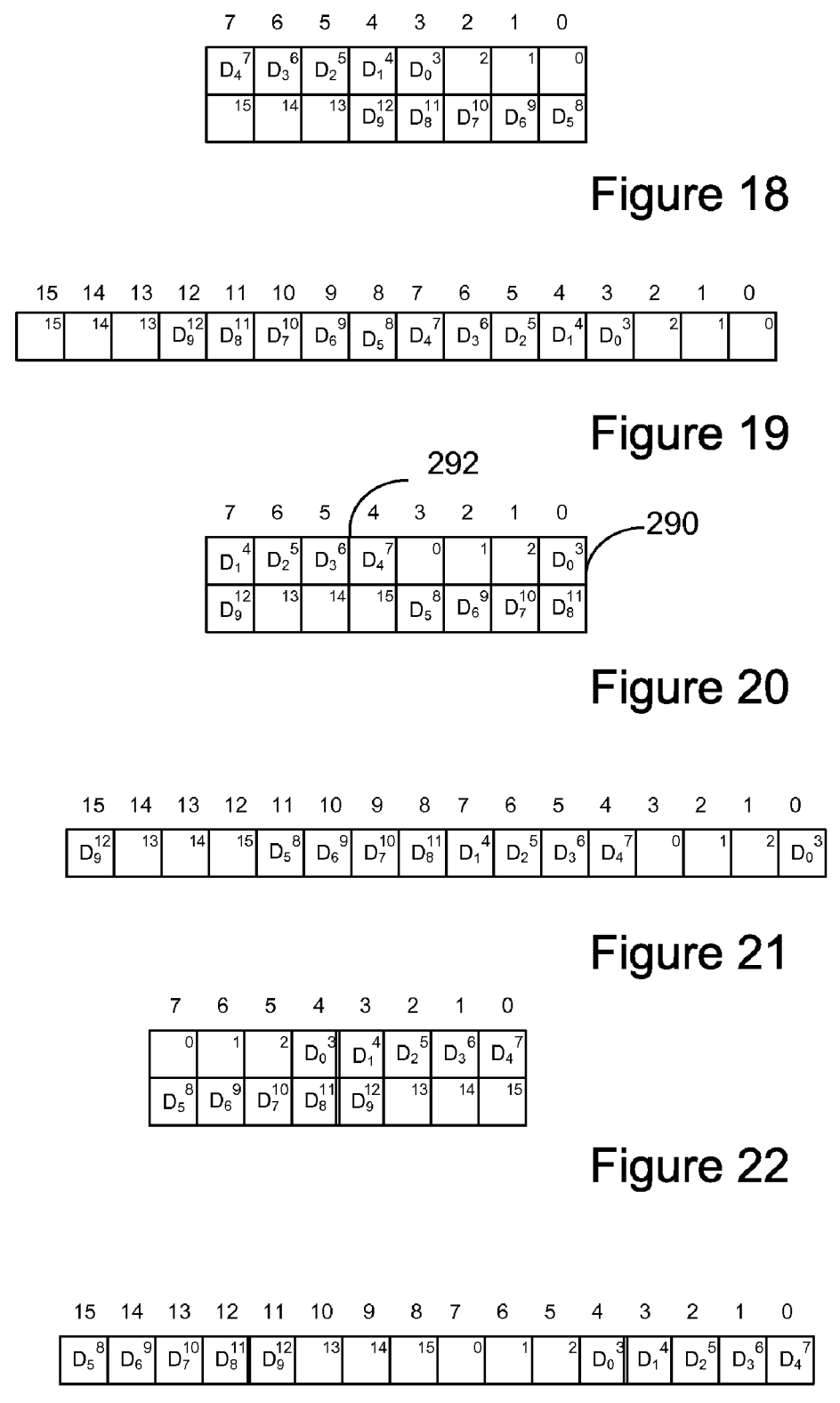

Little-endian is agnostic to data bus width. For example, FIG. 18 and FIG. 19 show 9-byte data in little-endian on 64- and 128-bit busses, respectively. The order of data bytes is the same. The number 0-7 in FIG. 18 and the number 0-15 in FIG. 19 represent the address offset within the data width of the corresponding AXI data bus. When the DMA descriptor indicates the data is in big-endian, the DMA engine will treat the corresponding data address in the descriptor as for big-endian data. Depending on the actual data type, big-endian data will have different mappings on the AXI data bus. For example, in FIG. 20, 32-bit big-endian data will start at address three on a DMA 64-bit data bus. Since this is for big-endian data, the address will be in big-endian. So, the first data byte 290 will go to AXI data byte lane-0, which has a big-endian address of 3. The second data byte 292 will be at big-endian address 4, which is at AXI data byte lane-7. Depending on the width of the data bus, unaligned big-endian data could be on noncontiguous AXI byte lanes. FIG. 21 shows the same 32-bit big endian data will start at address three on a DMA 128-bit data bus. FIG. 22 and FIG. 23 show the mapping of 64-bit big endian data on DMA 64-bit and 128-bit data buses, respectively.

Descriptor Pipelining

The control information to perform DMA transfer is stored in a descriptor. The descriptor consists of several words of data to indicate source address, destination address, DMA transfer byte count, and other information, such as endian format, hole insertion or removal etc. The descriptor is either stored in a register array or memory. Prior art DMA engines fetch and process one descriptor at a time. While the current descriptor is being serviced, these DMA engines pre-fetch the next descriptor to achieve higher system throughput. In the case of systems where the DMA transfers consist of lower transfer size and higher latency in fetching descriptors and processing DMA transfer, the throughput will be low if the prior art DMA engines fetch one or two descriptors per DMA channel.

An embodiment of the present invention has the capability to pre-fetch and process multiple descriptors within the same channel or multiple channels concurrently. The DMA descriptor fetching engine has dedicated descriptor context buffers to store the read and write DMA descriptor context information separately for each of the multiple concurrent channels. This permits the Read DMA control/port engines 346, 352 and write DMA control/port engines 348, 374 to process descriptors concurrently without any dependency on each other. These DMA channels can handle independent read and write transfers on the source and sink memory ports 308 and 310, respectively as explained above. As such, both read DMA port engine 352 and write DMA port engine 374 can fetch descriptors from the descriptor context buffers 340, 342 via through their respective control engines and issue multiple requests for read DMA transfers and write DMA transfers. In the case of read DMA transfer, while the data is still in transit or pending, owing to the long round-trip latency, the read DMA engines (control 346 and port 352) can fetch new descriptors from the read descriptor ring buffers 340 and issue requests as long as there is an available memory slot to store the incoming data. Thus, embodiments of the present invention support having multiple DMAs concurrently in flight in the same DMA direction and among multiple DMA directions.

In a similar manner, in the case of write DMA transfer, after issuing the write transfer on address and data channels towards the sink write port memory 310, while the response is in-flight or pending, the write DMA engines (control 348 and port 374) can fetch new descriptors from the write descriptor ring buffers 342 and perform new write transfers as long as the sink write port memory 310 is ready to accept the write transfer on address and data channels. This mechanism achieves higher throughput even with longer round trip latencies in fetching descriptors and DMA data from multiple memory spaces. Thus, embodiments of the present invention support having multiple DMAs concurrently in-flight in the same DMA direction and among multiple DMA directions.

Figure 24:
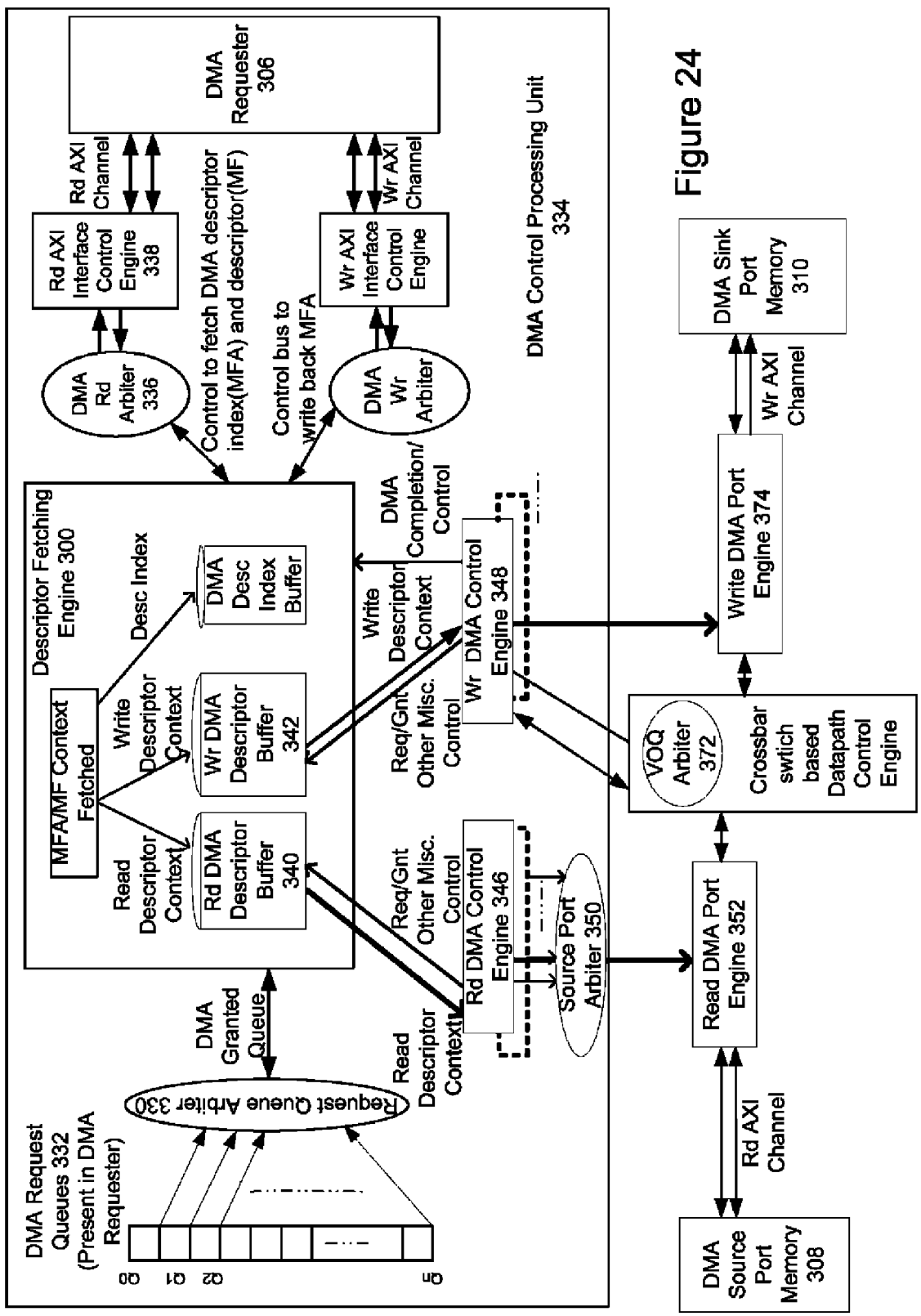
FIG. 24 illustrates descriptor-fetching logic in a DMA engine according to an embodiment of the present invention.
Figure 25:
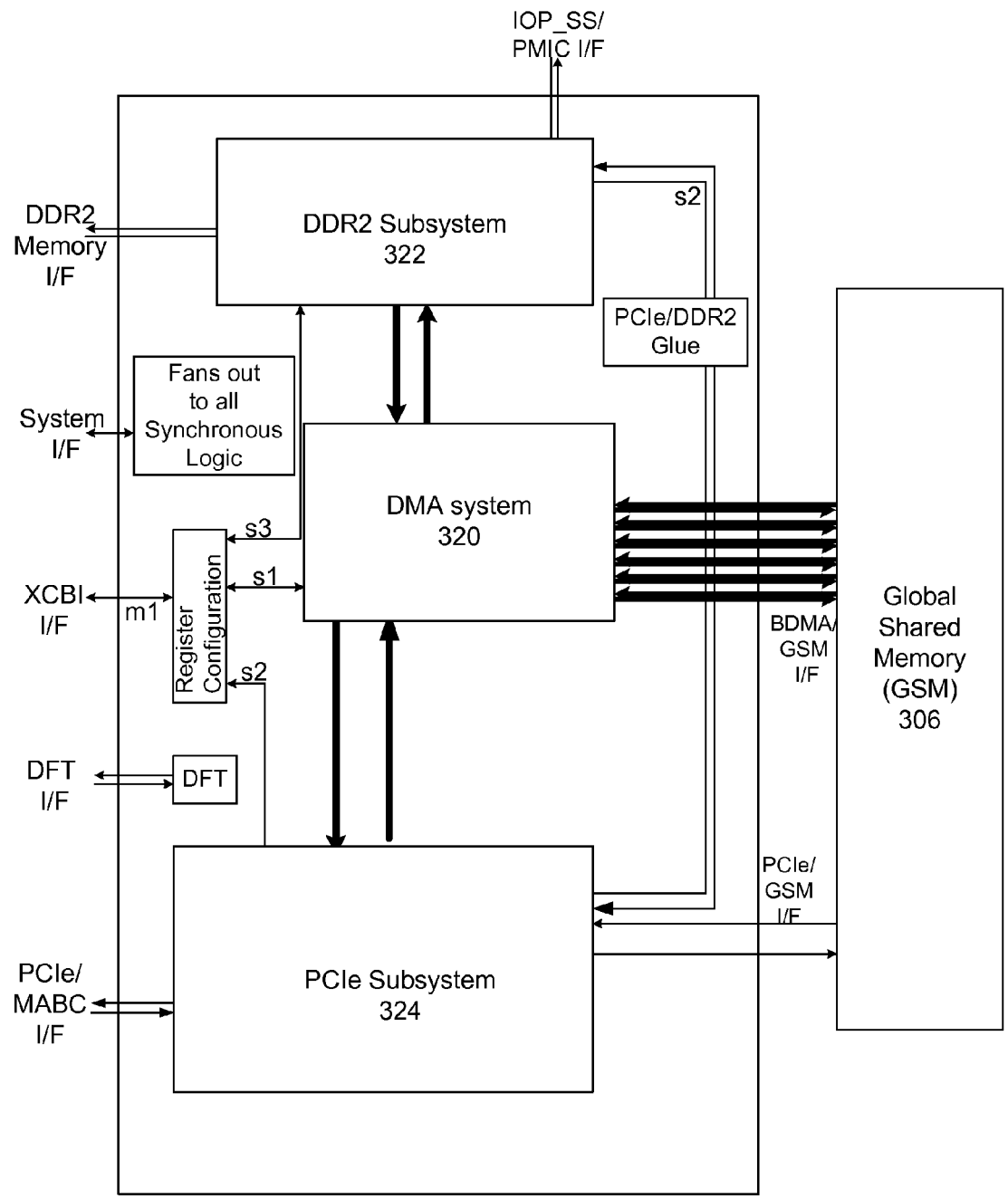
FIG. 25 illustrates a PMIC sub-system block diagram according to an embodiment of the present invention.
Figure 26:
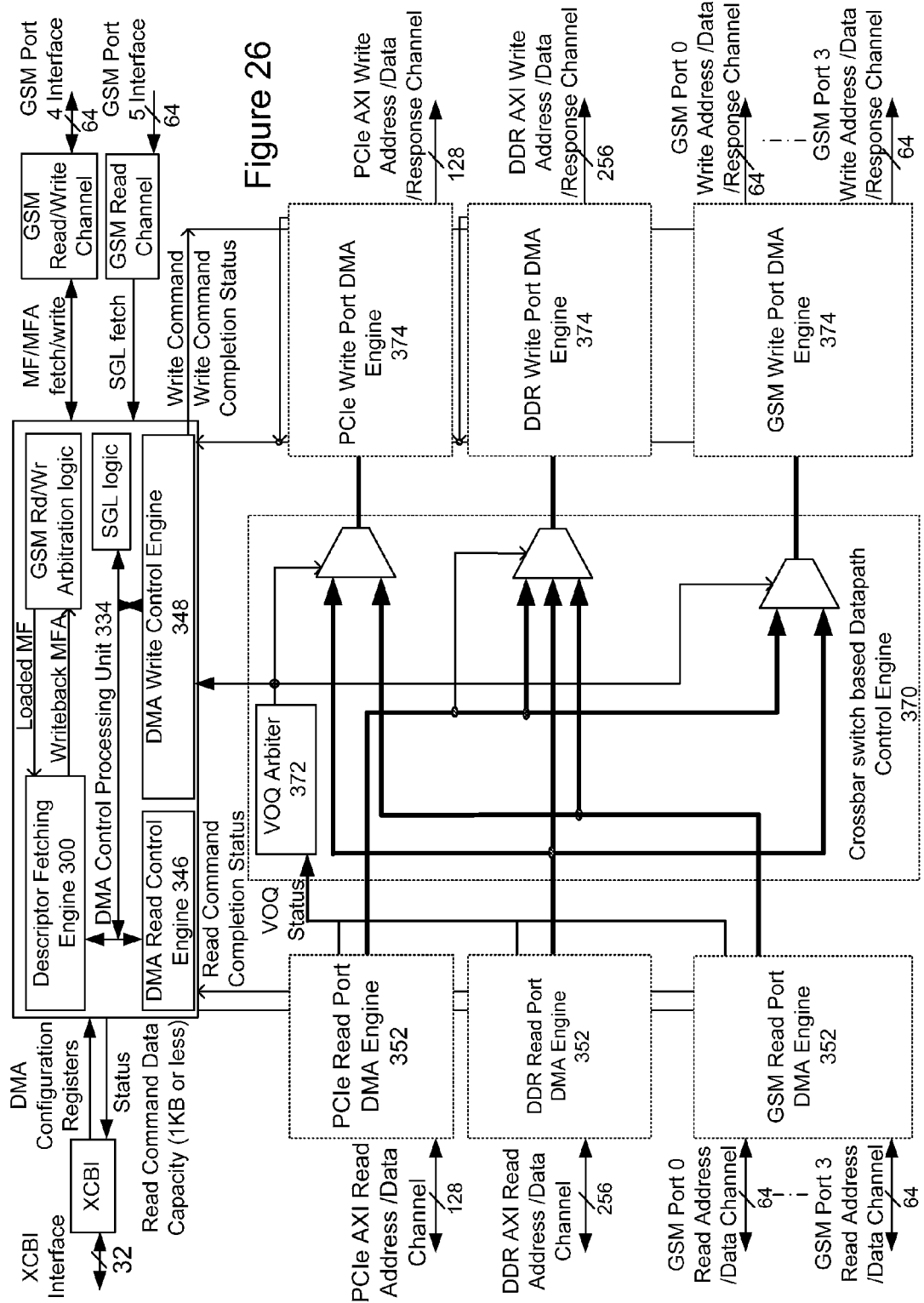
FIG. 26 illustrates a system block diagram of a DMA controller according to an embodiment of the present invention.
Figure 27A:
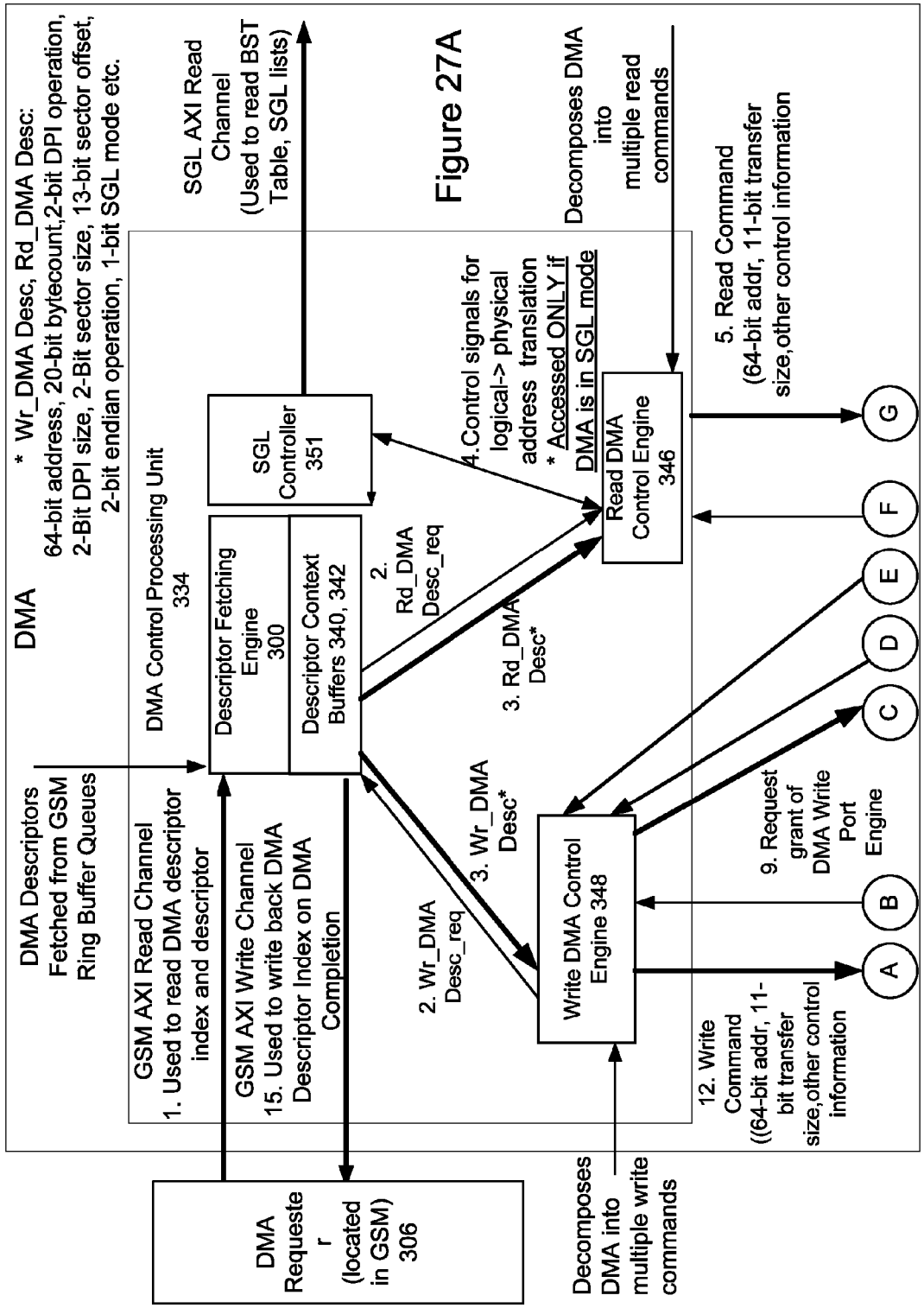
FIGS. 27A and 27B illustrate a functional dataflow diagram of a DMA controller according to an embodiment of the present invention.
Figure 27B:
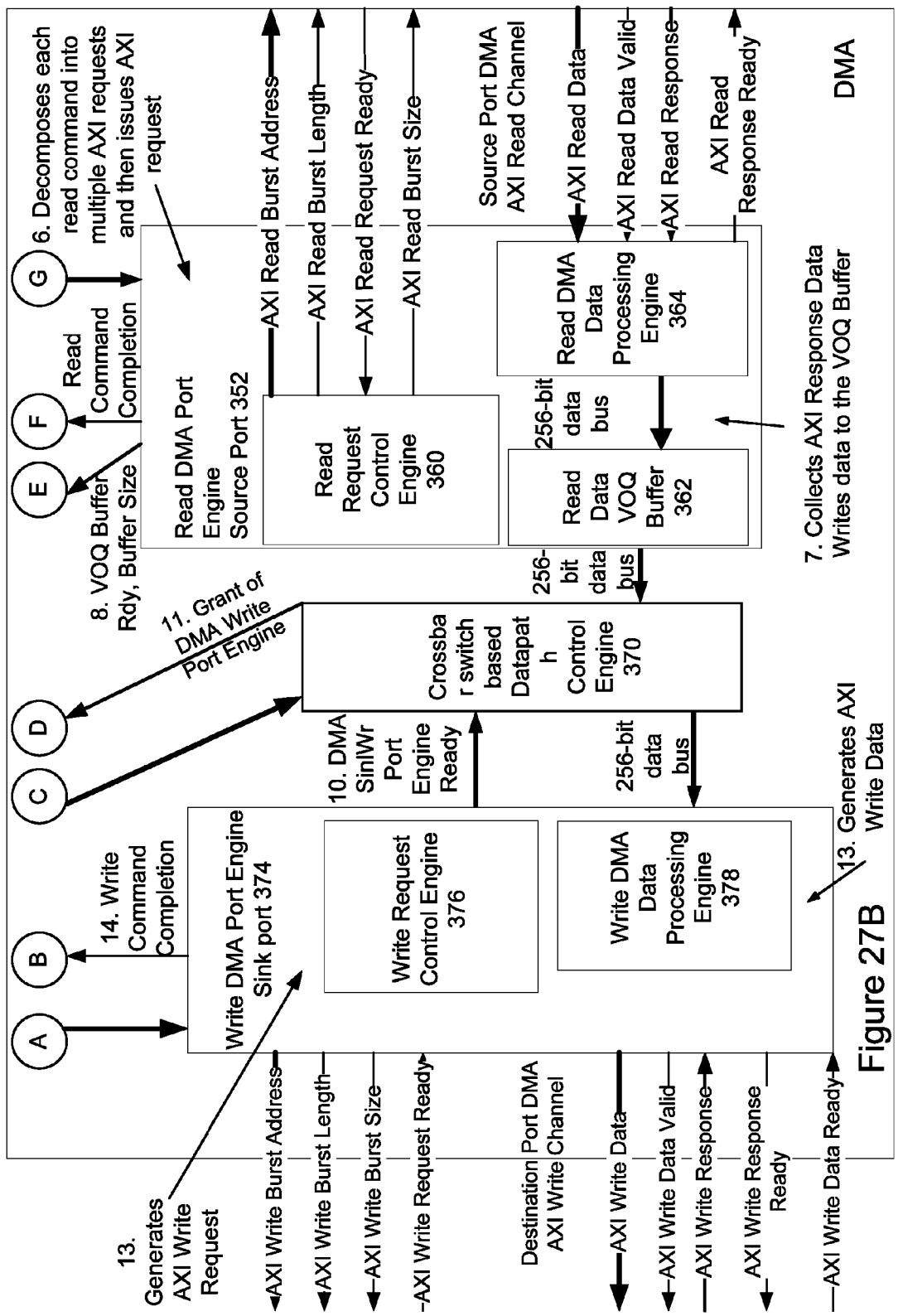
Figure 28:
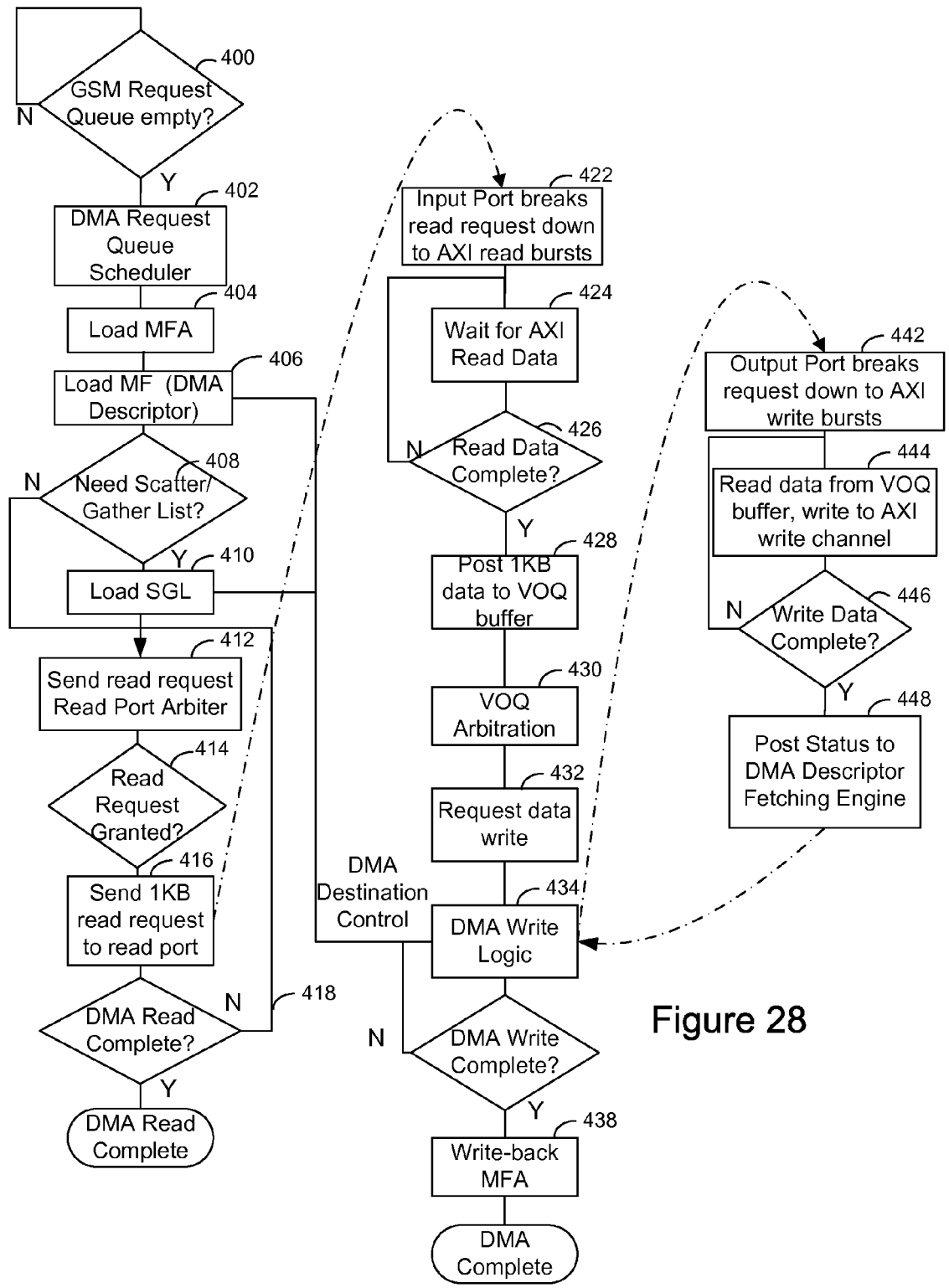
FIG. 28 illustrates a dataflow algorithm for a single DMA transfer using a DMA controller according to an embodiment of the present invention.

FIG. 24 illustrates an implementation of the descriptor fetching logic for a single channel and its interface with the DMA engines, DMA requestor 306, source read port memory 308 and sink write port memory 310. Embodiments of the present invention can be implemented in SAS RAID controllers, and SPC SAS protocol controller devices. FIG. 25 depicts the interface between DMA 320 with the memory sub-systems namely DDR 322, PCIe 324 and GSM 326, while FIG. 26 illustrates the system block diagram of a DMA controller and FIGS. 27A and 27B describe the functional dataflow operation of the embodiment. FIG. 28 illustrates the dataflow chart of a single DMA transfer for a specific DMA direction using the illustrated DMA controller. Since DMA supports multiple concurrent DMA transfers within the same DMA direction and across multiple DMA directions, the dataflow chart for multiple DMA transfer can be interpreted as multiple independent threads following the same protocol depicted in the dataflow chart.

The DMA engine 320 includes queue arbiters 330 for each DMA direction. These arbiters 330 poll through the request queues 332 (steps 400, 402) activated by the DMA requester 306 for data transfer and grant accesses based on the arbitration scheme. The DMA descriptor fetching engines 300 present in the DMA control processing unit 334 will send their requests to DMA read arbiter engine 336 so as to read the Descriptor Index (MFA) (step 404) and subsequently the DMA descriptor (step 406) via the AXI interface 338. Since the AXI interface 338 supports independent address and data channels, the DMA descriptor fetching engine 300 can fetch multiple descriptors concurrently.

TABLE 1

DMA MFA Structure:

| Bit | Type | Function |
| --- | --- | --- |
| 63:32 | R | MFA Application Tag[31:0] |
| 31 | W | Success |
| 30:22 | W | Error Status[8:0] |
| 21:20 | W | Reserved |
| 19:0 | R | MFAddress[22:3] |

The DMA descriptor specifies how data movement operations are to be executed. The DMA descriptor is defined as a Message Frame (MF) and the address pointer to the MF is called Message Frame Address (MFA). The MFA pointers are written and read out of the messaging queues and the MFs are stored in the shared memory of DMA requester. The format of Message Frame Address and the descriptor are illustrated in Table 1 and Table 2.

TABLE 2

DMA Descriptor Format:

| 32 bit Word | Address | Description |
| --- | --- | --- |
| 0 | 0x00 | SA[31:0] |
| 1 | 0x04 | SA[63:32] |
| 2 | 0x08 | DA[31:0] |
| 3 | 0x0C | DA[63:32] |
| 4 | 0x10 | Descriptor Control Word 1 |
| 5 | 0x14 | Descriptor Control Word 2 |
| 6 | 0x18 | MF Application Tag |
| 7 | 0x1C | Reserved |

Descriptor Control Word 1 contains control information about DMA transfer byte count, Source_SGL, Dest_SGL, Source_Endian, Dest_Endian, DMA Bypass Mode. Descriptor Control Word 2 contains control information about DPI (hole) insertion and removal.

TABLE 3

Source Address Fields:

| DMA | No Scatter/Gather (SOURCE_SG = 0) | | Scatter/Gather (SOURCE_SG = 1) | |
| --- | --- | --- | --- | --- |
| Source | SA[63:32] | SA[31:0] | SA[63:32] | SA[31:0] |
| DDR | Upper 32-bit DDR address | Lower 32-bit DDR address | DDR Scatter/Gather Logic Address | |
| PCI | Upper 32-bit PCI address | Lower 32-bit PCI address | PCI Scatter/Gather Logic Address | |
| GSM | Always 0 | GSM address | Always 0 | GSM address |

TABLE 4

Destination Address Fields:

| DMA | No Scatter/Gather (DEST_SG = 0) | | Scatter/Gather (DEST_SG = 1) | |
| --- | --- | --- | --- | --- |
| Destination | DA[63:32] | DA[31:0] | DA[63:32] | DA[31:0] |
| DDR | Upper 32-bit DDR address | Lower 32-bit DDR address | DDR Scatter/Gather Logic Address | |
| PCI | Upper 32-bit PCI address | Lower 32-bit PCI address | PCI Scatter/Gather Logic Address | |
| GSM | Always 0 | GSM address | Always 0 | GSM address |

When the Source_SGL bit in the DMA descriptor is not set, SA [63:0] fields are used as the beginning of source address. When the Source_SGL bit in the DMA descriptor is set, this DMA source address is using scatter/gather mode. When the Dest_SGL bit in the DMA descriptor is not set, DA [63:0] fields are used as the beginning of destination address. When the Dest_SGL bit in the DMA descriptor is set, this DMA destination address is using scatter/gather mode. If scatter/gather mode is indicated (step 408), the appropriate SGL is loaded (step 410).

For a specific channel, on fetching a descriptor, the DMA descriptor fetching engine 300 can store the descriptor context information for read and write operations in two separate descriptor buffers 340, 342. The DMA engine 320 supports processing multiple DMA transfers concurrently for the same channel. These descriptor ring buffers 340, 342 will be filled with descriptors as long as there is an empty slot available in the buffer provided that there are valid DMA requests issued by the DMA requester 306. Each DMA channel has a set of read DMA control engine 346 and write DMA control engine 348.

In case of a read DMA operation, the read DMA control engine 346 can send request and fetch descriptors from read DMA descriptor buffers 340. Based on the DMA transfer byte count, it will break the read DMA transfer into multiples of 1 Kbyte read commands (step 416). In case of DMA transfer involving SGL on source port, the read DMA control engine 346 can issue a request on source port arbiter 350 and when granted access to the SGL controller 351, it can issue the logical address to fetch the physical translated address and fragment byte count. The mechanism to fetch translated addresses by the SGL controller 351 is based on the address translation scheme described above. On completion of issuing read commands for the DMA in-flight (loop 418), even while the data for read commands is in-flight, the read DMA control engine 346 issues a posted completion status to the descriptor fetching engine 300 and fetches a new DMA descriptor.

Each source read port has a corresponding port arbiter interface 350. The read DMA control engines 346 that have a common source read port post their requests towards the source port arbiter 350 (step 412). The access is granted to one read DMA control engine 346 at a time based on the availability of buffer slots in the VOQ data buffer (step 414). The granted read DMA control engine 346 now has full accessibility over the read DMA port engine 352.

The read DMA port engine 352 comprises a read request control engine 360, VOQ data buffer 362 to store the processed data and read DMA data processing engine 364. On receiving a 1 Kbyte read command (step 416), the request control engine 360 can issue multiple AXI read transactions (step 422) to fetch the 1K data (step 424), until the read request is complete (step 426). If the address is unaligned, the first read transaction can align the address to the closest burst boundary so that the subsequent read transfers optimally utilize the bandwidth. On completion of the read command, the read DMA port engine 352 can be granted to the next pending 1K read command. In this way, while the data is in flight, owing to longer round trip data latency, the read DMA port engine 352 can support multiple read AXI transactions concurrently. The read DMA data processing engine 364 can receive the incoming data from the source port data channel. This DMA data processing engine 364 can thereby identify the location of the DPI holes, and remove them if present, (specified in the DMA descriptor control word 2), pack all the valid bytes into double words (32-byte words) by performing data width adjustment. If the data stream requires an endian mode translation, the read DMA data processing engine 364 performs endian conversion and then the resulting data is stored in the allocated buffer slot in VOQ data buffer 362 (step 428). The VOQ data buffer 362 has dedicated buffer slots for each DMA direction so that it has the capability to support concurrent multiple DMA transfers from different DMA channels.

The crossbar switch based datapath module 370 consists of VOQ arbiter 372 that grants access to the requests issued by write DMA control engines 348 for accessing the corresponding write DMA port engine 374 (step 430). It also has control logic to steer the control information between source read port 308 and sink write port 310 when the connection is made for DMA transfer. The VOQ arbiter 372 monitors the FIFO status of VOQ data buffer 362 and whether the write DMA port engine 374 is ready to accept data. Based on these inputs, it grants access to one of the pending requests issued by write DMA control engine 374 (step 432).

The write DMA control engine 348 fetches the descriptor information from the write descriptor ring buffer 342 as well as byte count information of the slots filled in VOQ data buffer 362 for that specific DMA channel. Based on the slot byte count, it issues write command requests towards the VOQ arbiter 372 for grant of write DMA port engine 374. It issues DMA transfer posted completion status towards the appropriate descriptor fetching engine 300 when all the write commands for the DMA have been issued and proceeds forward to fetch new descriptor (step 434). On receiving responses for all the write commands that are in flight for a particular DMA, the write DMA control engine 348 issues DMA transfer response completion status to the descriptor fetching engine 300 (step 448). The descriptor fetching engine 300 uses these completion status to issue a new descriptor to write DMA control engine 348 and as well as to write back the DMA completion status to DMA requester 306 (step 438).

The write DMA port engine 374 comprises a write request control engine 376, and write DMA data processing engine 378. For the memory interfaces that do not support back pressuring data, the write DMA port engine 374 may contain a memory buffer to store data read from the VOQ data buffer 362 so to sustain the transfer bandwidth. The write request control engine 376 and write DMA data processing engine 378 receive write commands from the upstream write DMA control engine 348 and issue multiple AXI write transactions towards the sink write memory interface (step 442). The write request control engine 376 has the capability to break the transaction into multiple transfers with contiguous write strobe (write enable), if the data happens to be non-contiguous. For example, if the write command was to write 8 bytes of data across an address 0x0000 such that write strobe was 11000111, the write request control engine will break this write transaction into two write transfers, the first with address 0x0000 and write strobe 00000111 and the second with address 0x0006 and write strobe as 11000000. The write DMA data processing engine 378 issues data for the respective write address request across the write AXI interface of the sink (destination) write port 310.

The write DMA data processing engine 378 consists of a data de-aligner module that adjusts the data read from VOQ data buffer 362 to appropriate data bus width of the destination port. In case of DMA data transfer in SGL mode, it contains control logic to send requests to the SGL interface arbiter. When the arbiter grants access, it issues the relevant logical address in order to fetch the translated physical address of the destination port and fragment byte count. On receiving a write command from the write DMA control engine 348, the write DMA data processing engine 378 issues control logic to read data present in the source VOQ buffer slot, adjust the data to the appropriate bus width of the destination port and transmit it via the AXI Interface bus (step 444). It also consists of control logic to insert DPI holes and endian conversion if the appropriate bits in Descriptor Control Word 1 and Descriptor Control Word 2 are asserted.

The above-described embodiments of the invention are intended to be examples only. Alterations, modifications and variations can be effected to the particular embodiments by those of skill in the art without departing from the scope of the invention, which is defined solely by the claims appended hereto.

What is claimed is:

1. A direct memory access (DMA) system, comprising
at least one physical memory space for storing a fragmented physical buffer comprising arbitrarily aligned and arbitrarily sized memory fragments defined by a scatter/gather list (SGL);
a DMA master to create a DMA descriptor requesting transfer of data to or from the fragmented physical buffer, the fragmented physical buffer being represented as a contiguous logical address space wherein each of the fragments is mapped to contiguous logical offset addresses;
a DMA engine to process the DMA descriptor, and associated with logical to physical address translation logic to determine a physical address corresponding to a logical offset address of one of a fragments by accessing an SGL element associated with the fragment to determine a physical start address for the fragment, and offsetting the physical start address by the logical offset address less the length of preceding fragments listed in the SGL.

2. The DMA system of claim 1 comprising a plurality of physical memory spaces and a buffer state table associated with each of the plurality of memory spaces, individual entries in the buffer state tables representing active logical buffers defined by independent SGLs stored in the plurality of physical memory spaces.

3. The DMA system of claim 2 wherein the SGLs can be stored in any of the plurality of physical memory spaces, and the buffer state table entries include an SGL location.

4. The DMA system of claim 2 wherein fragments associated with a particular SGL can be stored in any of the plurality of physical memory spaces, and wherein the SGL elements include a fragment location.

5. The DMA system of claim 2 wherein the plurality of memory spaces are accessed concurrently.

6. The DMA system of claim 5 wherein a plurality of direction-based DMA channels are defined between read and write ports of the plurality of physical memory spaces, and wherein data transfers are executed in parallel on any subset of the direction-based channels.

7. The DMA system of claim 6 wherein each of the direction-based DMA channels is associated with a virtual output queue buffer and wherein a virtual output queue arbitrated crossbar switch transfers data from the respective virtual output queue buffers to write ports of the plurality of physical memory spaces.

8. The DMA system of claim 7 wherein a physical memory space is provided with multiple physical ports, and wherein data is striped across the multiple physical ports.

9. The DMA system of claim 6 wherein the DMA engine executes an arbitration scheme to arbitrate access to contended ports.

10. The DMA system of claim 6 wherein each of the direction-based DMA channels is provided with a separate request queue.

11. The DMA system of claim 1 wherein the data is formatted in sectors and the DMA engine inserts data protection information between the sectors.

12. The DMA system of claim 1 wherein the data is formatted in sectors and the DMA engine removes data protection information between the sectors.

13. The DMA system of claim 1 wherein the DMA engine and the logical to physical address translation logic are implemented separately, the DMA engine providing the logical offset address to the logical to physical address logic, and the logical to physical address translation logic returning the physical address and the remaining byte count to the DMA engine, the remaining byte count indicating the length of the fragment from the physical address to the end of the fragment.

14. The DMA system of claim 1 wherein the DMA engine is associated with a data processing engine to pack the data and an endian conversion module to fragment the packed data into bytes and re-pack the data in accordance with a desired endian format.

15. A method for logical address to physical address translation for direct memory access (DMA) to a fragmented physical buffer comprising arbitrarily aligned and arbitrarily sized memory fragments defined by at least one scatter/gather list (SGL), comprising:

mapping each of the fragments to contiguous logical offset addresses in a contiguous logical address space equal to a total length of the fragments; and determining a physical address corresponding to a logical offset address of one of the fragments by:

accessing an SGL element associated with a fragment to determine a physical start address for the fragment; and offsetting the physical start address by the logical offset address less the length of preceding fragments listed in the at least one SGL.

16. The method of claim 15 further comprising defining a buffer state table associated with each of a plurality of memory spaces, individual entries in the buffer state tables representing active logical buffers defined by independent SGLs stored in the plurality of physical memory spaces.

17. The method of claim 16 further comprising storing the SGLs in any of the plurality of physical memory spaces, and providing an SGL location in the buffer state table entries.

18. The method of claim 16 further comprising storing fragments associated with a particular SGL in any of the plurality of physical memory spaces, and providing a fragment location in the SGL elements.

19. The method of claim 16 wherein the plurality of memory spaces are accessed concurrently.

20. The method of claim 19 wherein a plurality of direction-based DMA channels are defined between read and write ports of the plurality of physical memory spaces, and wherein data transfers are executed in parallel on any subset of the direction-based channels.

21. The method of claim 20 further comprising arbitrating access to contended ports.

22. The method of claim 20 further comprising striping data across multiple physical ports associated with a physical memory space.

* * * * *